United States Patent [19]
Haraguchi

[11] Patent Number: 5,329,326
[45] Date of Patent: Jul. 12, 1994

[54] CAMERA WITH MOTOR FOR DRIVING FLASH MECHANISM AND EXPOSURE-PREPARATORY MECHANISM

[75] Inventor: Shousuke Haraguchi, Kanagawa, Japan

[73] Assignee: Canon Kabushiki Kaisha, Tokyo, Japan

[21] Appl. No.: 19,919

[22] Filed: Feb. 19, 1993

Related U.S. Application Data

[63] Continuation of Ser. No. 654,028, Feb. 12, 1991, abandoned.

[30] Foreign Application Priority Data

Feb. 14, 1990 [JP] Japan ................... 2-034460

[51] Int. Cl.$^5$ .................. G03B 15/03; G03B 9/64; G03B 19/12
[52] U.S. Cl. ................ 354/149.1; 354/149.11; 354/152; 354/266
[58] Field of Search ............... 354/412, 413, 419, 456, 354/479, 152, 154, 149.11, 266, 226, 170, 173.1, 173.11, 149.1, 214

[56] References Cited

U.S. PATENT DOCUMENTS

| | | | |
|---|---|---|---|
| 4,679,925 | 7/1987 | Kawamura et al. | 354/173.1 |
| 4,752,796 | 6/1988 | Tsukahara et al. | 354/214 |
| 4,766,452 | 8/1988 | Ohara et al. | 354/173.1 |
| 4,768,051 | 8/1988 | Sasaki | 354/400 |
| 4,821,059 | 4/1989 | Nakanishi et al. | 354/173.1 X |
| 4,864,336 | 9/1989 | Fukahori et al. | 354/152 |
| 4,893,140 | 1/1990 | Yamamoto et al. | 354/149.11 |
| 4,941,010 | 7/1990 | Aihara et al. | 354/152 |
| 4,963,905 | 10/1990 | Haraguchi et al. | 354/152 |
| 4,970,539 | 11/1990 | Sasagaki et al. | 354/149.1 |
| 4,973,996 | 11/1990 | Harvey | 354/173.1 |
| 4,982,210 | 1/1991 | Shimada et al. | 354/149.1 |
| 5,012,262 | 4/1991 | Mogamiya et al. | 354/149.11 |
| 5,012,267 | 4/1991 | Higashihara | 354/402 |
| 5,012,269 | 4/1991 | Tosaka et al. | 354/419 |
| 5,070,349 | 12/1991 | Haraguchi et al. | 354/152 |

FOREIGN PATENT DOCUMENTS

| | | |
|---|---|---|
| 0202073 | 7/1986 | European Pat. Off. . |
| 61-289332 | 12/1986 | Japan . |
| 63-195637 | 8/1988 | Japan . |
| 2235057 | 2/1991 | United Kingdom . |

OTHER PUBLICATIONS

Patent Abstracts of Japan, vol. 12, No. 46 (P-665), Feb. 12, 1988.
WPIL Database, week 9106, Derwent Pub. Ltd. London, Class S06 P82.
Patent Abstracts of Japan, vol. 14, No. 59 (P-1000), Feb. 2, 1990.

Primary Examiner—W. B. Perkey
Attorney, Agent, or Firm—Fitzpatrick, Cella, Harper & Scinto

[57] ABSTRACT

A camera includes a flash mechanism, an exposure-preparatory operation mechanism, a motor, a clutch mechanism arranged to transmit an output of the motor to the flash mechanism during the time of operation of the motor in a first direction and to transmit the output of the motor to the exposure-preparatory operation mechanism during the time of operation of the motor in a second direction, a first detecting device for detecting an operational state of the flash mechanism, a second detecting device for detecting an operational state of the exposure-preparatory operation mechanism, and a controller for controlling driving of the motor in response to outputs from the first and second detecting devices.

15 Claims, 20 Drawing Sheets

FIG.5

| SEQUENCE \ SIGNAL | DETECTION PATTERN 23 | DETECTION PATTERN 24 |
|---|---|---|
| COMPLETION AND STOP OF SHUTTER CHARGE | Lo | Lo |
| START OF MIRROR-UP OPERATION | ⇩ | Lo |
| ENERGIZATION OF MOTOR 1 | Hi | Lo |
| BRAKING PHASE OF MOTOR 1 | Hi | ⇩ |
| STOP OF MIRROR-UP OPERATION | Hi | Hi |
| COMPLETION PHASE OF MIRROR-DOWN OPERATION | Hi | ⇩ |
| ENERGIZATION OF MOTOR 1 | Hi | Lo |
| ″ | Hi | ⇩ |
| ″ | Hi | Hi |
| FIRST BRAKING PHASE OF MOTOR 1 | ⇩ | Hi |
| ENERGIZATION OR BRAKING OF MOTOR 1 | Lo | Hi |
| SECOND BRAKING PHASE OF MOTOR 2 | Lo | ⇩ |
| COMPLETION AND STOP OF SHUTTER CHARGE | Lo | Lo |

FIG.11

| SEQUENCE / SIGNAL | SIGNAL DETECTING CONTACT PIECE 42 | SIGNAL DETECTING CONTACT PIECE 43 |
|---|---|---|
| FLASH UNIT STOPS AT DOWN POSITION | Lo | Hi |
| FLASH UNIT IS MOVING UPWARD | Lo | ⇩ |
| BRAKING PHASE OF UPWARD MOVEMENT | ⇩ | Lo |
| FLASH UNIT STOPS AT UP POSITION | Hi | Lo |
| FLASH UNIT IS MOVING DOWNWARD | Hi | ⇩ |
| BRAKING PHASE OF DOWNWARD MOVEMENT | ⇩ | Hi |
| FLASH UNIT STOPS AT DOWN POSITION | Lo | Hi |

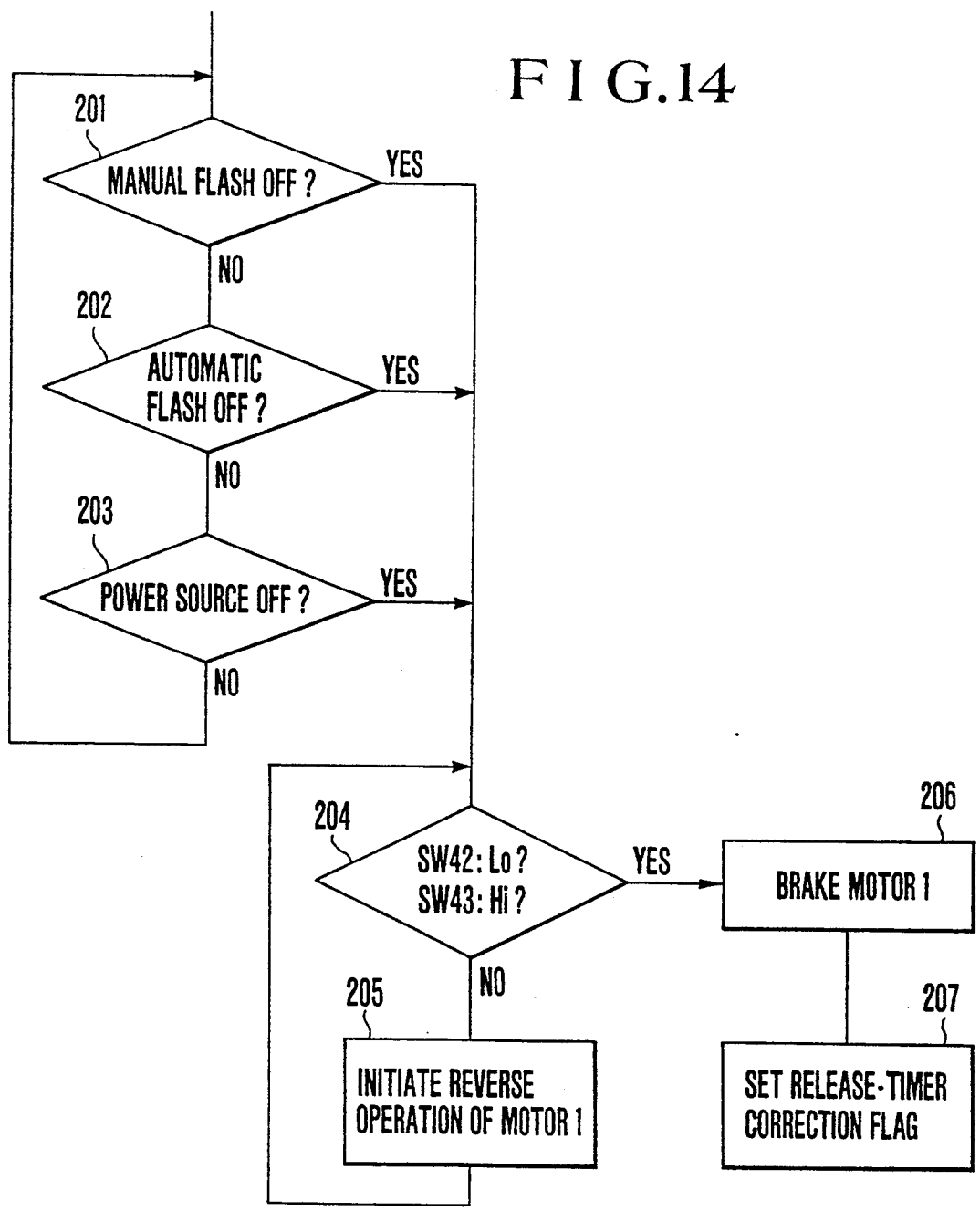
F I G. 14

FIG.15B
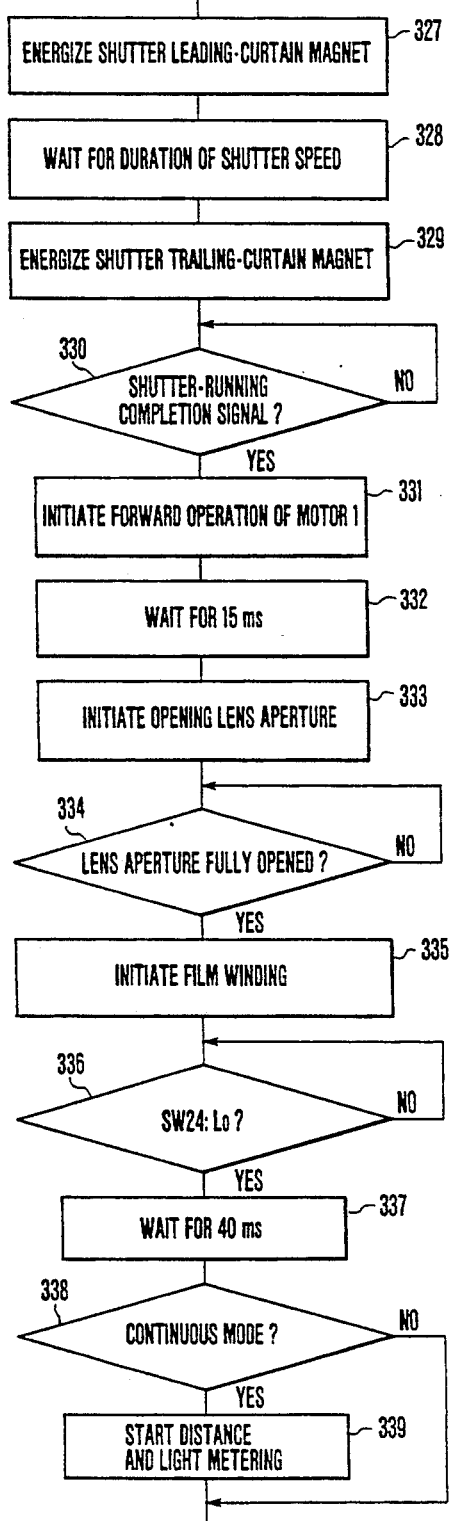
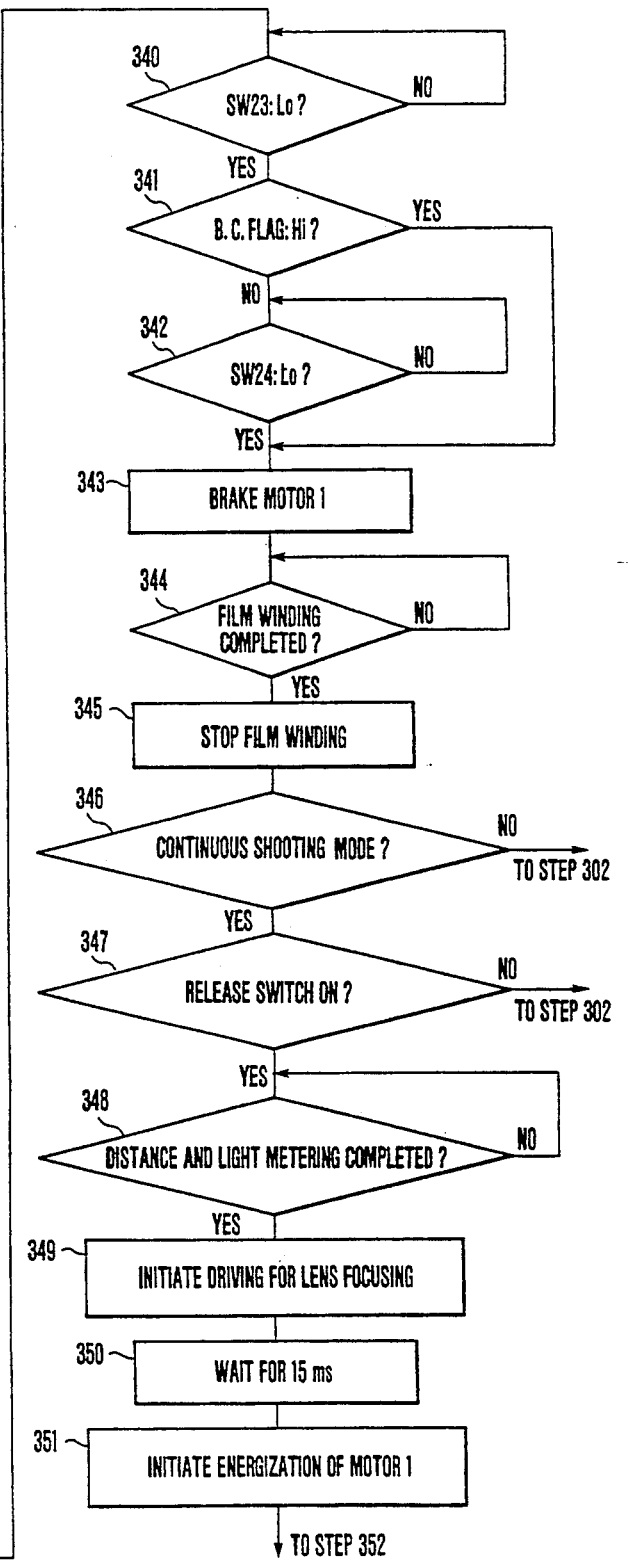

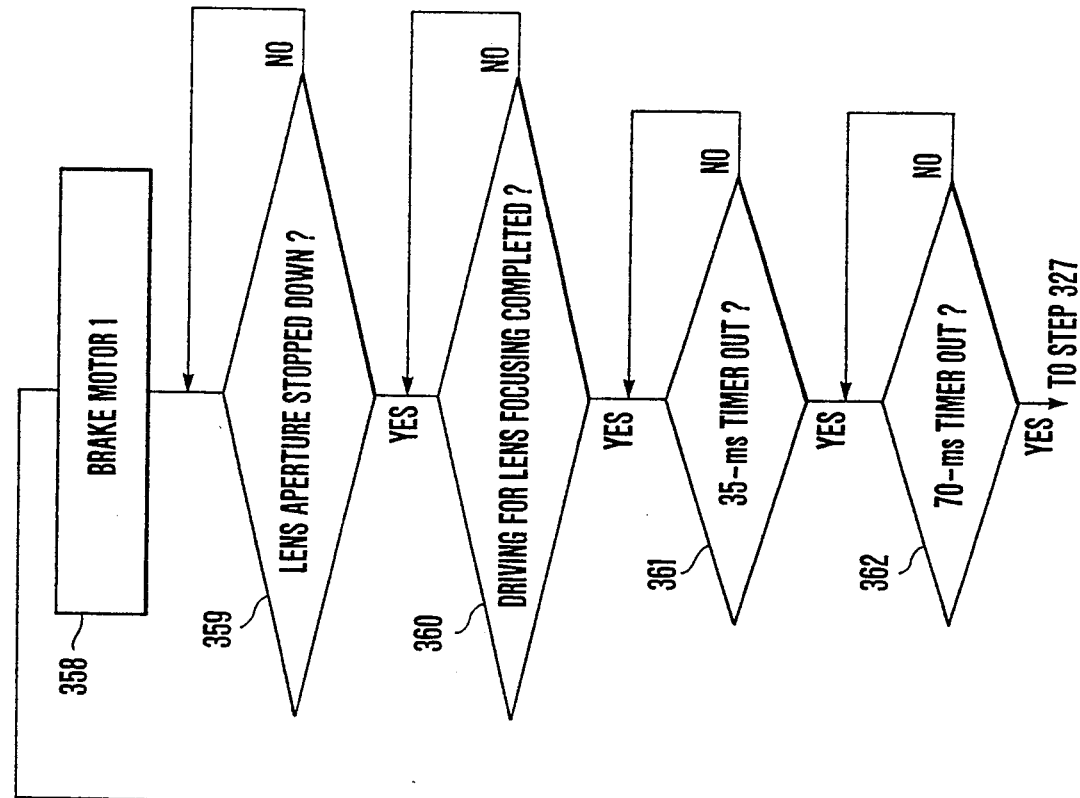
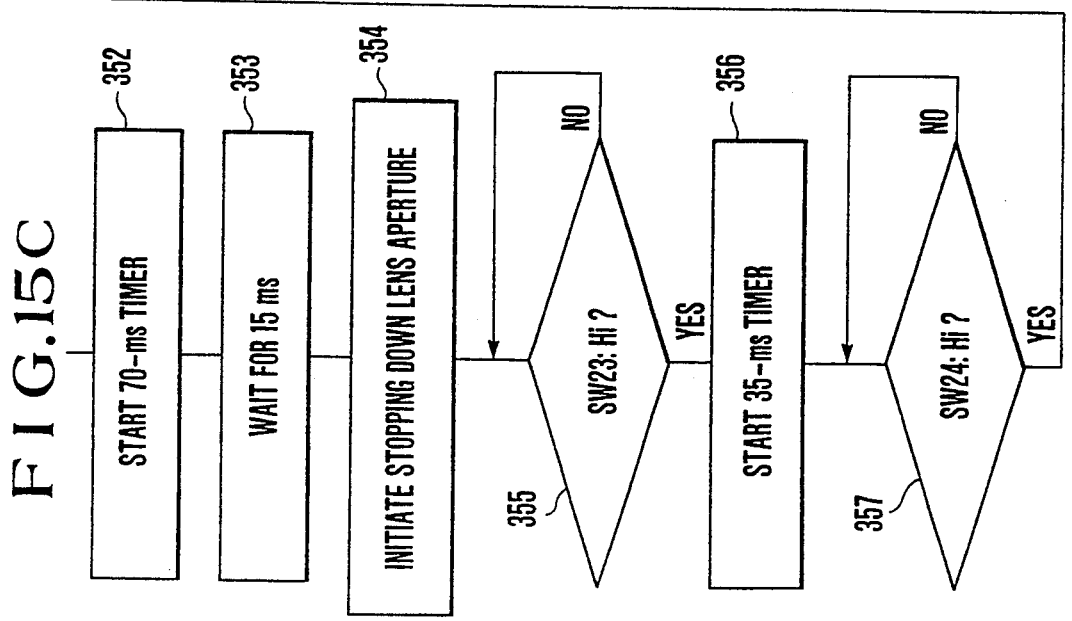
FIG. 15C 5,329,326

CAMERA WITH MOTOR FOR DRIVING FLASH MECHANISM AND EXPOSURE-PREPARATORY MECHANISM

This application is a continuation of application Ser. No. 07/654,028 filed Feb. 12, 1991, abandoned.

BACKGROUND OF THE INVENTION

1. Field of the Invention

The present invention relates to a camera having a flash mechanism driven by a motor.

2. Description of the Related Art

A conventional apparatus for electrically driving a built-in flash unit of a single-reflex camera is proposed in Japanese Laid-Open Patent Application No. Sho 63-195637. This proposal discloses a mechanism for moving the flash unit up and down by utilizing the forward and reverse operation of a motor.

However, the conventional example employs an exclusive motor for driving the flash unit, with the result that the motor is not utilized in combination with another mechanism and effective motor utilization has not yet been achieved.

A system for driving a flash unit by the operation of a motor in one direction and for effecting film transport by the operation of the motor in the other direction, is proposed in U.S. patent application Ser. No. 375,952 filed on Jul. 6, 1989 (now U.S. Pat. No. 5,012,269, issued Apr. 30, 1991).

The proposed system is desirable in that a single motor is effectively utilized.

SUMMARY OF THE INVENTION

It is an object of the present invention to provide a camera which is arranged to drive a flash mechanism by the operation of a motor in one direction and to drive an exposure-preparatory operation mechanism by the operation of the motor in the other direction and also in which an operational-state detecting means is provided for each of the mechanisms, whereby effective utilization of the motor is achieved and the reliability of operation of each mechanism is improved.

BRIEF DESCRIPTION OF THE DRAWINGS

FIG. 5 is a table showing the state of signal detection during the exposure-preparatory operation of the camera according to the first embodiment;

FIG. 11 is a table showing the state of signal detection during the flash-unit driving operation of the camera according to the first embodiment;

FIG. 14 is a flowchart showing the flash-unit down operation of the camera according to the first embodiment;

FIGS. 15A, 15B and 15C are flowcharts showing a photographic sequence of the camera according to the first embodiment;

DETAILED DESCRIPTION OF THE PREFERRED EMBODIMENTS

Preferred embodiments of the present invention will be described below in detail with reference to the accompanying drawings.

FIGS. 1 to 15A, 15B and 15C show a first embodiment of the present invention. In the first embodiment, a motor is disposed on one side of the mirror box of a single-reflex camera in a direction substantially perpendicular to the optical axis of a photographic lens, and the motor is used to effect driving for an exposure-preparatory operation, such as a mirror driving operation, a shutter charging operation and the like, as well as driving of a flash unit disposed above a pentagonal prism. The first embodiment makes it possible to realize an arrangement having a shortened transmission path and, hence, improved driving efficiency.

The driving required for the exposure-preparatory operation including the mirror driving operation, the shutter charging operation and the like will be described below with reference to FIGS. 1 to 5. A clutch mechanism will be described with reference to FIG. 6, a flash-unit driving mechanism with reference to FIGS. 7 to 11, a control circuit with reference to FIG. 12, and a camera's photographic sequence with reference to the flowcharts shown in FIGS. 13 to 15A, 15B and 15C.

Figure 1:
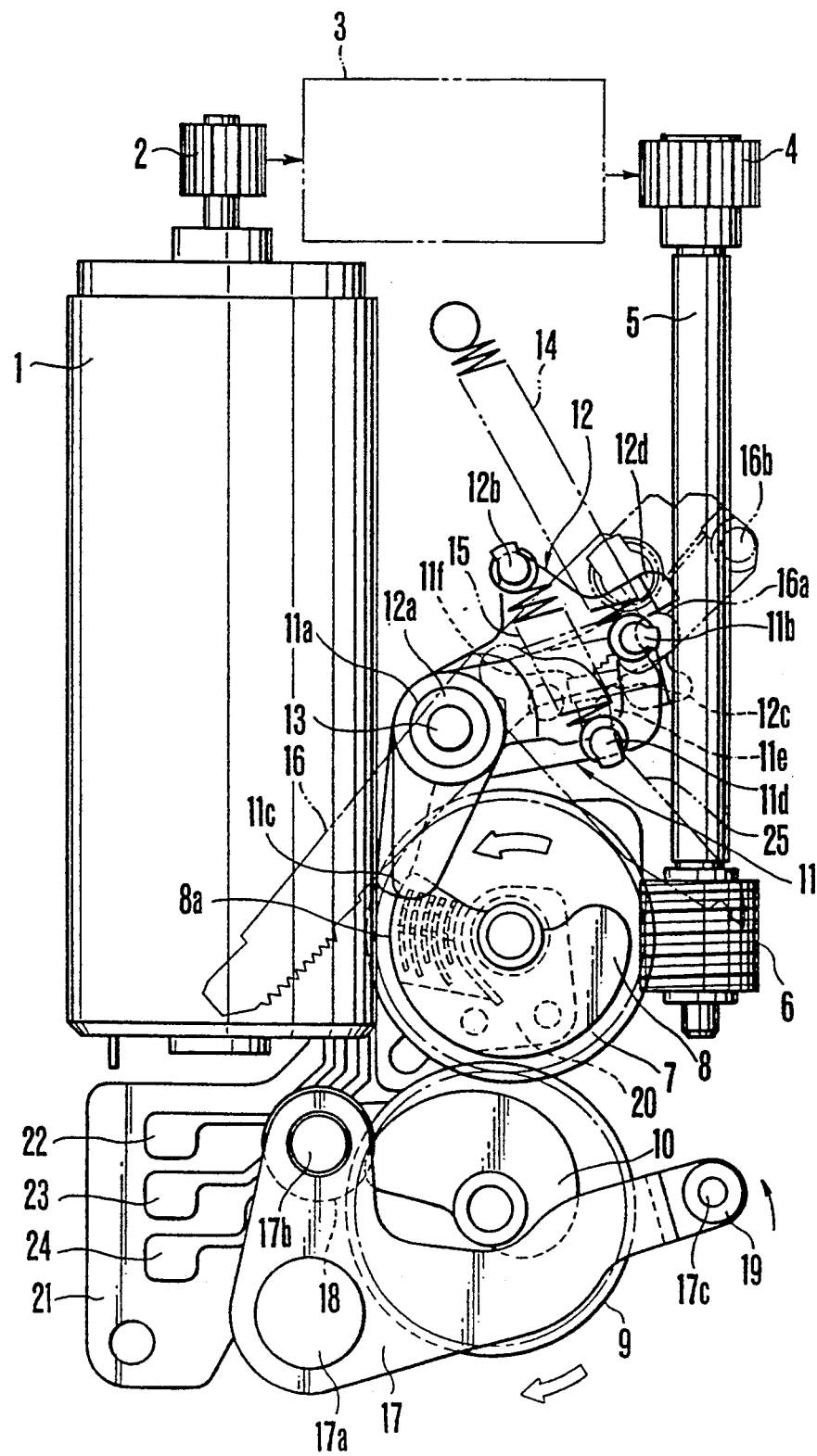
FIG. 1 is a diagrammatic view showing a state wherein the mirror-down operation of a camera according to a first embodiment is completed and stopped.

Referring to FIG. 1, which shows the first embodiment of the present invention in a mirror-down state, a motor is indicated by reference numeral 1 and a gear 2 is fixed to the output shaft of the motor 1. A transmission mechanism 3 is disposed to transmit the output of the gear 2 to a gear 4. The transmission mechanism 3 may be constructed from, for example, a speed reduction gear train as will be described in detail in connection with FIG. 6. The gear 4 is fixed to one end of a transmission shaft 5 and a worm gear 6 is fixed to the other end of the transmission shaft 5. A helical gear 7 is made to rotate only in the counterclockwise direction indicated by the arrow shown on the helical gear 7 by the operation of the motor 1 in a first direction. A mirror driving cam 8 is fixed to the helical gear 7. A helical gear 9 is meshed with the helical gear 7 and is allowed to rotate in the clockwise direction only as viewed in FIG. 1. A shutter charging cam 10 is fixed to the helical gear 9. A shaft 13 is formed integrally with a front base plate (not shown). A shaft portion 12a of the lever 12 is fitted onto the shaft 13 and a shaft portion 11a of the lever 11 is fitted onto the shaft portion 12a. In this arrangement, the length of engagement of both levers 11 and 12 is increased so that each of the lever 11 and the lever 12 can be pivotally supported with a minimum inclination due to play. The lever 11 is urged by a spring 14 in the counterclockwise direction with respect to a spring hooking portion 11b. An abutment portion 11c of the lever 11 is positioned in abutment with a maximum-diameter portion 8a of the mirror driving cam 8, and is held at a location to which it is turned in the clockwise direction against the urging force of the spring 14. The maximum-diameter portion 8a of the mirror driving cam 8 is shaped into a predetermined rounded form. A spring 15 is held at one end by a spring hooking portion 11d of the lever 11 and, at the other end, by a spring hooking portion 12b of the lever 12. As viewed in FIG. 1, the spring 15 urges the lever 11 in the counterclockwise direction and the lever 12 in the clockwise direction so that the levers 11 and 12 are pulled toward each other. Taking only the levers 11 and 12 into consideration, an abutment portion 11e of the lever 11 and an abutment portion 12c of the lever 12 are held in abutment with each other by the spring force of the aforesaid spring 15 so that the relative turning motion between the levers 11 and 12 is inhibited. The abutment portion 11e is formed as a projection which projects from the lever 11 in the direction of the reverse side of the sheet of FIG. 1, and is shaped in section to have a height which enables abutment with the abutment portion 12c present on the reverse side of the apparatus as shown in FIG. 1. An inspection hole 11f is formed as a window for inspection of the state of abutment or non-abutment of the abutment portions 11e and 12c, and is used for the purpose of overcharge inspection. An arm portion 12d of the lever 12 is positioned in abutment with a driving pin 16a of a movable mirror (main mirror) 16. The movable mirror 16 is turnable about a shaft 16b. When in the state of FIG. 1, the movable mirror 16 is forced in the counterclockwise direction and held at a mirror-down position (finder-viewing position). In this state, the clockwise turn of the lever 12 is inhibited, while the lever 11 is placed in an overcharged state by being turned against the spring 15 in the clockwise direction to a further extent, whereby the abutment portions 11e and 12c are not in abutment. A detail of the arrangement of the movable mirror 16 will be described later in connection with FIG. 2. A shutter charging lever 17 is supported for pivotal motion about a shaft 17a. A roller 18 is supported for rotation about a shaft 17b, and is in abutment with the shutter charging cam 10. A roller 19, which is rotatably supported by a shaft 17c, is in abutment with a charge lever for a shutter (not shown). The shutter charging lever 17 is arranged to charge the shutter (not shown) while being turned in the counterclockwise direction. In the state shown in FIG. 1, the shutter is held in a completely charged state. A contact piece 20 secured to the surface of the helical gear 7 which is located on the reverse side of the apparatus as shown in FIG. 1, and is rotated in contact with a surface of a circuit board 21. The surface of the circuit board 21 is provided with detection patterns 22, 23 and 24. Details of the circuit board 21 will be described later in connection with FIG. 3.

Figure 2:
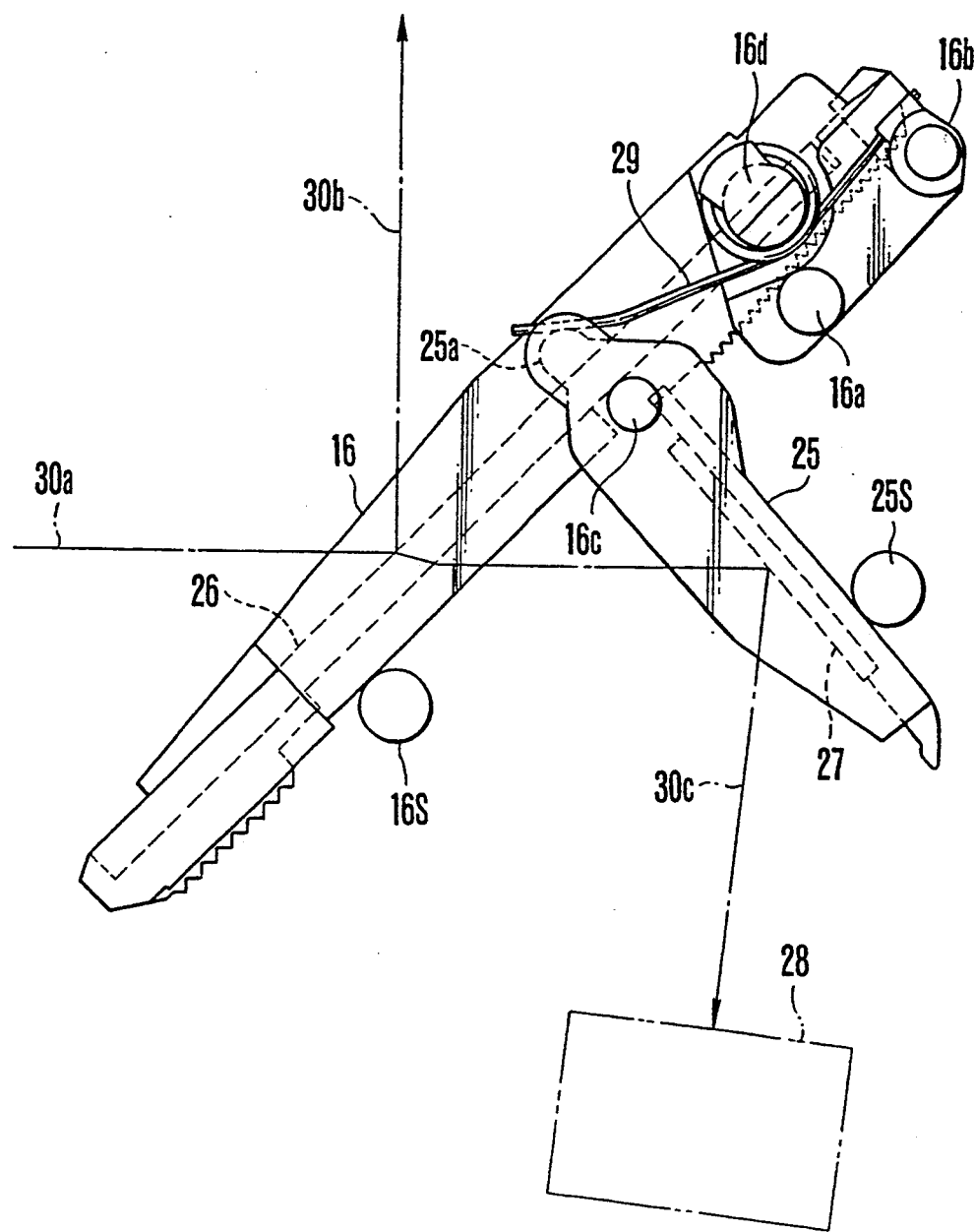
FIG. 2 is a diagrammatic view showing the state of a movable mirror when the camera according to the first embodiment is in a mirror-down state.

FIG. 2 is a view showing the state of the movable mirror 16 when in a mirror-down state. The movable mirror 16 is supported for pivotal motion about the shaft 16b. As explained in connection with FIG. 1, the driving pin 16a is held by the arm portion 12d by the urging force which is generated in the counterclockwise direction by the spring 15. The movable mirror 16, when in this state, is held in the mirror-down position in abutment with a stopper 16S. A submirror 25 is supported for pivotal motion about a shaft 16c integrally provided on the movable mirror 16. A spring 29 is supported at an intermediate portion by the spring hooking portion 16d, and one end of the arm of the spring 29 is in abutment with the movable mirror 16, while the other end is in abutment with an operating portion 25a of the submirror 25, thereby constituting a toggle mechanism. In the toggle mechanism, when in the mirror-down position, the spring 29 urges the submirror 25 in the counterclockwise direction as viewed in FIG. 2 and, when in the mirror-up position, urges the submirror 25 in the clockwise direction. To implement such a toggling operation, a cam member is needed, but a description thereof is omitted since various proposals have been made and publicly known. A stopper 25S restricts the counterclockwise rotation of the submirror 25 caused by the spring 29 when the movable mirror 16 is in the mirror-down position (focus detecting position) shown in FIG. 1. The stopper 25S is provided with an adjustment mechanism. Regarding the adjustment mechanism, since various constructions, such as a construction utilizing an eccentric pin, are known, explanation is omitted.

A half-mirror 26 is fixed to the movable mirror 16. A total reflection mirror 27 is fixed to the submirror 25. In FIG. 2, reference numeral 30a denotes the optical axis of central light rays which travel into the camera body through a photographic lens (not shown), and reference numeral 30b denotes an optical axis along which part of the central light rays reflected by the surface of the half-mirror 26 are conducted toward a viewfinder optical system (not shown). Reference numeral 30c denotes an optical axis along which part of the central light rays transmitted through the half-mirror 26 are totally reflected by the total reflection mirror 27 and conducted toward a distance-metering unit 28. Since various proposals have been made with respect to the construction of the distance-metering unit 28, a detailed description thereof is omitted.

Figure 3:
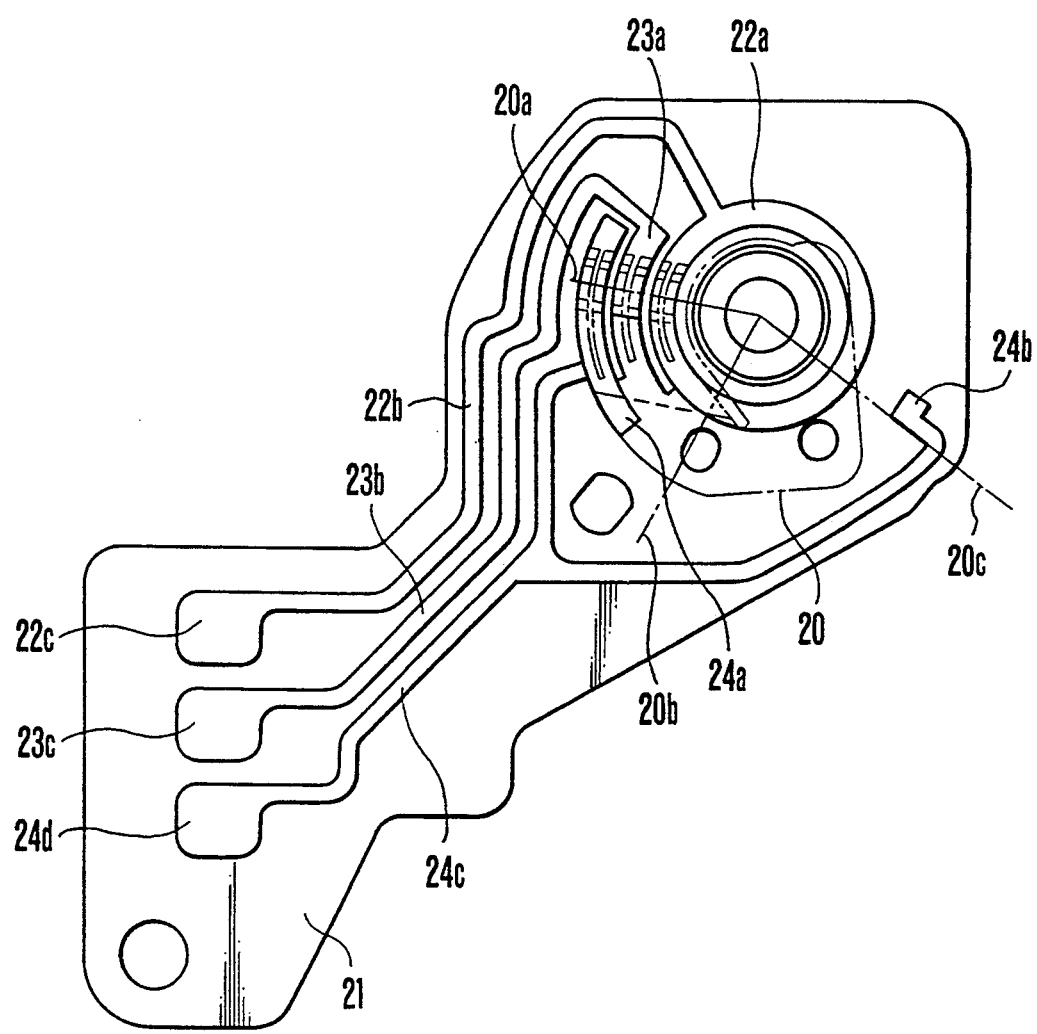
FIG. 3 is a diagrammatic view showing the state of signal detection when the camera according to the first embodiment is in the mirror-down state.

FIG. 3 is a schematic view showing the state of signal detection when a mirror-down operation is stopped. A surface of the circuit board 21 is provided with detection patterns 22, 23 and 24. The detection pattern 22 is supplied with a ground potential through an input portion 22c, and the ground potential is supplied to a signal pattern portion 22a through a connection portion 22b. The detection pattern 23 includes a signal pattern portion 23a, a connection portion 23b and an output portion 23c, and the detection pattern 24 includes signal pattern portions 24a and 24b, a connection portion 24c and an output portion 24d. The contact piece 20 is brought into contact with the signal pattern portions 22a, 23a and 24a which are concentrically spaced apart along a line represented as a contact line 20a, whereby it is determined whether the ground potential supplied from the detection pattern 22 is conducted to the detection patterns 23 and 24. In the following explanation, it is assumed that when the detection patterns 23 and 24 come into contact with the detection pattern 22, each of the detection patterns 23 and 24 is set to a low (Lo) level; if not in contact with the detection pattern 22, each of the detection patterns 23 and 24 is set to a high (Hi) level. When the movable mirror 16 is placed in the mirror-down-operation stop position shown in FIGS. 1 to 3, the signal pattern portions 22a, 23a and 24a are electrically connected and each of the detection patterns 23 and 24 is at the low level.

Figure 4:
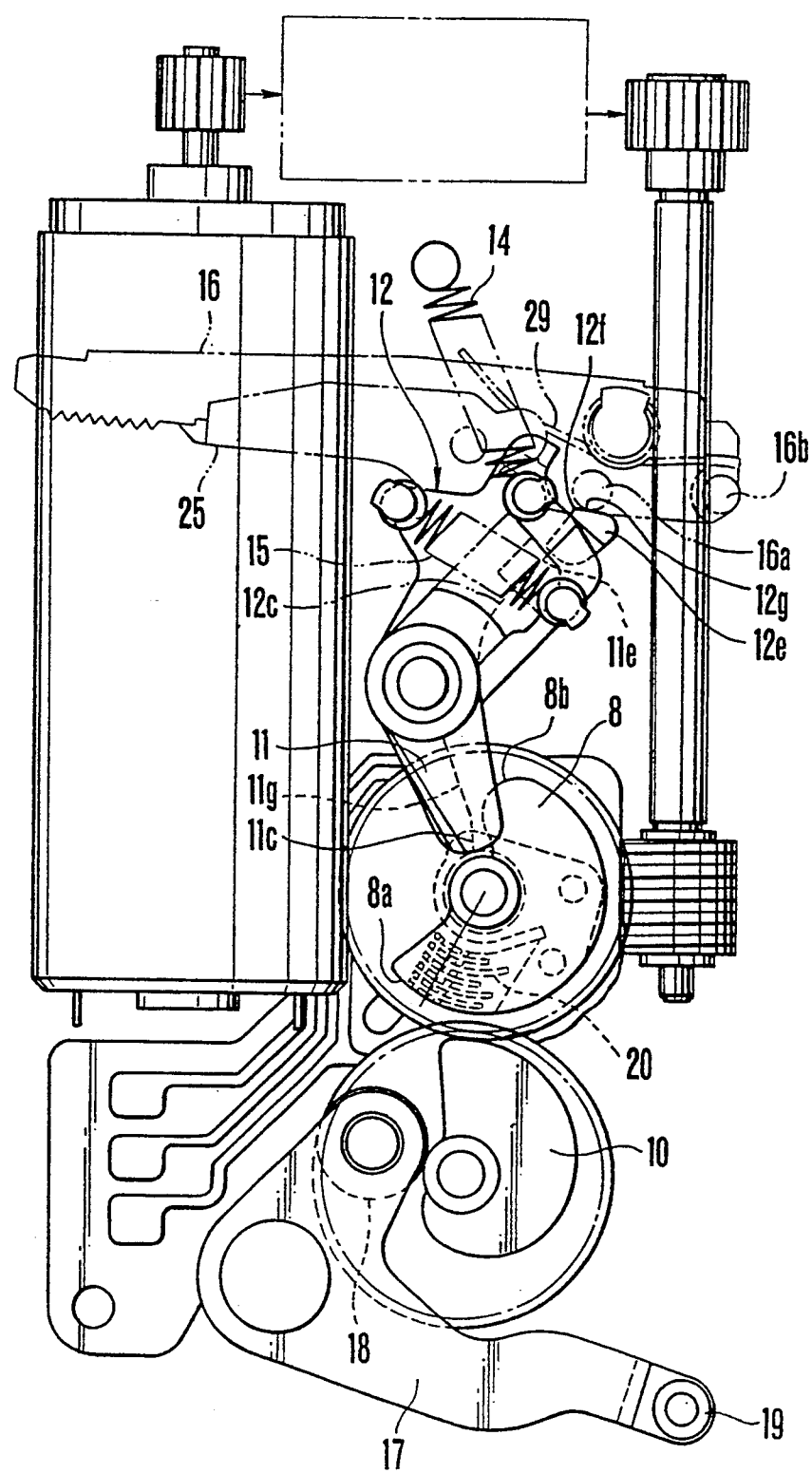
FIG. 4 is a diagrammatic view showing a state wherein the mirror-up operation of the camera according to the first embodiment is completed and stopped.

FIG. 4 is a schematic view of the first embodiment, showing a mirror-up-operation stop state wherein both the movable mirror 16 and the submirror 25 are placed in their exposure positions. The abutment portion 11c of the lever 11 and the maximum-diameter portion 8a of the mirror driving cam 8 come out of abutment with each other, and the lever 11 is turned in the counterclockwise direction by the spring 14. The abutment portion 11e of the lever 11 and the abutment portion 12c of the lever 12 are in abutment with each other by the spring 15. The lever 12 is also turned in the counterclockwise direction by the action of the aforesaid abutment portions 11e and 12c. Cam portions 12f and 12g are formed at the end of the arm portion 12e of the lever 12, and this end is brought into abutment with the driving pin 16a of the movable mirror 16 to cause the movable mirror 16 to turn upward in the clockwise direction. When the lever 12 in the mirror-down state of FIG. 1 initiates a counterclockwise turn, the cam portion 12f having a projection-like configuration initially comes into abutment with the driving pin 16a to turn the movable mirror 16 in the clockwise direction. When the lever 12 further turns and reaches the vicinity of the mirror-up position, the point of abutment with the driving pin 16a travels from the cam portion 12f to the cam portion 12g. Immediately thereafter, when the movable mirror 16 comes into abutment with a stopper (not shown), the mirror-up operation is completed. The cam portion 12g shown in FIG. 4 has an angle which serves to increase a retaining force for retaining the movable mirror 16 in the mirror-up state, thereby preventing the movable mirror 16 from bounding at the mirror-up position as a result of the mirror-up operation. Even in a case where it is impossible to completely prevent the movable mirror 16 from bounding merely by the retaining force derived from the cam portion 12g, the cam portion 12f acts to stop the movable mirror 16 with a minimum number of bounds, whereby it is possible to stabilize the movable mirror 16 at the mirror-up state within a short time.

When in the mirror-up state, the submirror 25 is also turned in the counterclockwise direction by the mechanism explained in connection with FIG. 2 and is brought into abutment with the movable mirror 16 by the action of the spring 29. As a result of the counterclockwise rotation, a cam portion 8b of the mirror driving cam 8 is brought into abutment with a cam portion 11g of the lever 11 to effect a mirror-down operation. Since the roller 18 is disengaged from the maximum-diameter portion of the shutter charging cam 10, the shutter charging lever 17 is turned in the clockwise direction and the roller 19 operates to release the charge retained state of the charge lever of the shutter (not shown). In the above-described state, the shutter (not shown) is ready to initiate an exposure operation.

The signal detection state of the circuit board 21 at this time will be explained below. The state of the contact piece 20 corresponds to the state of FIG. 4, and the contact line 20a is turned in the counterclockwise direction up to a position 20b as shown in FIG. 3. When in the position 20b, the contact piece 20 is in contact with the signal pattern portion 22a only, and each of the detection patterns 23 and 24 is at the high level.

The process of transition from the mirror-up operation stop position (exposure position) of FIG. 4 to the mirror-down operation stop state shown in FIG. 1 will be described below. By the cooperative action of the cam portion 8b and the abutment portion 11c caused by the counterclockwise rotation of the mirror driving cam 8, the lever 11 is made to turn in the clockwise direction, while the movable mirror 16 is made to turn in the counterclockwise direction and reaches a predetermined down position where the movable mirror 16 is in contact with the stopper 16S. The lever 11 further turns in the counterclockwise direction until the above-described overcharged state is reached, and the point of abutment with the abutment portion 11c travels from the cam portion 8b to the maximum-diameter portion 8a. Meanwhile, the cam 10 and the roller 18 come into abutment with each other, so that the shutter charging lever 17 initiates turning in the counterclockwise direction. Basically, a mirror-down operation precedes a shutter charging operation. However, the aforesaid driving loads are overlapped so as to maintain an approximately uniform load within a range in which a maximum load is not exceeded.

The state of signal detection upon completion of a mirror-down operation will be described below. The contact piece 20 is further rotated in the counterclockwise direction so that the contact line is shifted from the position 20b of FIG. 3 to a position 20c. When in the position 20c, the contact line is in contact with the signal pattern portions 22a and 24b and the detection patterns 23 and 24 are at a high level and a low level, respectively.

FIG. 5 is a table showing the state of signal detection during the operation of the camera.

In the state shown in FIGS. 1 to 3, each of the detection patterns 23 and 24 is at the low level as described above. In this state, energization of the motor 1 is initiated, and the detection pattern 23 is switched from the low level to the high level in the phase where the abutment portion 11c of the lever 11 is released from the maximum-diameter portion 8a of the cam 8. In this phase, the movable mirror 16 starts to move up by virtue of the spring 14 and stabilizes at the mirror-up position in a predetermined time. In other words, by setting a predetermined timer on the basis of the aforesaid signal detection state, it is possible to detect the timing of stabilization of the movable mirror 16 at the mirror-up position, irrespective of the state of a voltage level. During the above-described operation, the energization of the motor 1 is continued, and the detection pattern 24 is switched from the low level to the high level in the phase where the roller 18 is released from the state of being restricted by the shutter charging cam 10. At this point in time, the energization of the motor 1 is stopped and the motor 1 is braked by short-circuiting its terminals, whereby each mechanism comes to rest in the state shown in FIG. 4. After completion of the exposure operation, when energization of the motor 1 is initiated and the mirror-down position is reached, the signal of the detection pattern 24 is switched from the high level to the low level. According to this signal, it is possible to accurately detect the timing when the movable mirror 16 and the submirror 25 reach the mirror-down position, irrespective of the state of an electrical power source. In addition, by setting a predetermined timer on the basis of such timing, it is possible to accurately detect the timing when the movable mirror 16 and the submirror 25 stabilize. Although, during the energization of the motor 1, the detection pattern 24 switches from the low level to the high level, the energization of the motor 1 is continued. When the roller 18 reaches the maximum-diameter portion of the shutter charging cam 10, the detection pattern 23 switches from the high level to the low level by means of the signal pattern portion 23a. When the shutter charging cam 10 further rotates by a predetermined angle, the detection pattern 24 switches from the high level to the low level by means of the signal pattern portion 24a. The above-described signal-level change is utilized so that it is possible to set the timing when the energization of the motor 1 is stopped and its terminals are short-circuited to brake the motor 1 to bring the operation to rest in the state of FIG. 1. If the source voltage is high, the speed of revolution of the motor 1 is fast and the amount of overrun is large. For this reason, the motor 1 is braked when the detection pattern 23 changes from the high level to the low level. If the source voltage is low, the speed of revolution of the motor 1 is slow and the amount of overrun is small. For this reason, the motor 1 is braked when the detection pattern 24 changes from the high level to the low level.

Although, in the first embodiment, switching between the braking timings is performed at two different times only, if such switching is performed at shorter intervals, a more accurate stop phase can be obtained. Accordingly, the time period from the moment for initiating energization of the motor 1 until the moment for initiating a mirror-up operation can be kept shorter and stabler for variations in the source voltage.

With the arrangement described above, it is possible to realize a reduction in and the stabilization of a release time lag and also an arrangement which is advantageous for accurately detecting the timing of stabilization of a movable mirror at the mirror-up position if the frame speed of continuous shooting is to be increased in a flying release system such as that disclosed in U.S. Pat. No. 4,679,925.

Figure 6:
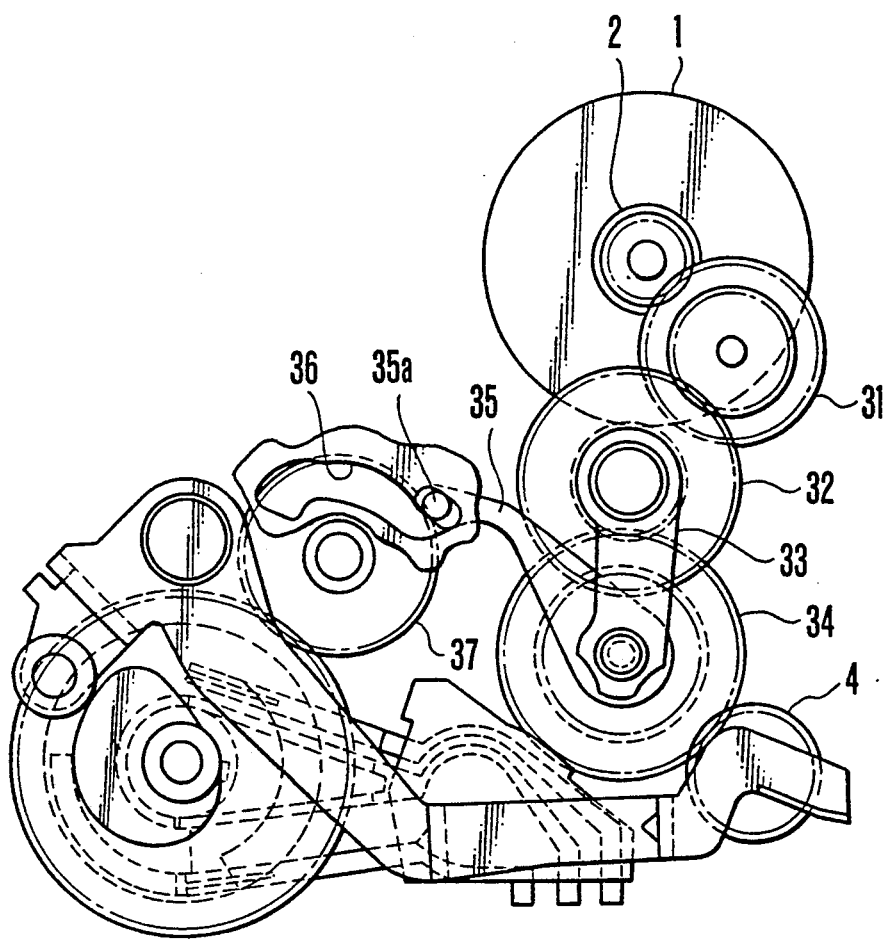
FIG. 6 is a diagrammatic view showing a clutch mechanism of the camera according to the first embodiment.

FIG. 6 is a schematic view of a clutch mechanism, showing the aforesaid driving state for an exposure-preparatory operation. Details of the construction of the aforementioned transmission mechanism 3 will now be described with reference to FIG. 6. A gear 31 is a double gear which reduces the output speed of the gear 2 and transmits the reduced-speed rotation to a sun gear 32. A planetary gear 34 is supported by a planetary arm 33 in such a manner that it can revolve around the sun gear 32. By providing the planetary gear 34 with a friction mechanism (not shown), a revolving force therefor is produced. If the motor 1 is operated in a first direction (in the counterclockwise direction as viewed in FIG. 6), the sun gear 32 rotates about its axis in the counterclockwise direction, while the planetary gear 34 revolves in the counterclockwise direction and meshes with the gear 4 as shown in FIG. 6. Driving by the gear 4 has been explained in connection with FIGS. 1 to 5. If the motor 1 is operated in a second direction (in the clockwise direction as viewed in FIG. 6), the planetary gear 34 revolves in the clockwise direction and meshes with a gear 37. A planetary switching restricting member 35 is coaxially frictionally coupled to the planetary gear 34. A planetary switching restricting cam 36 restricts the motion of a restriction pin 35a. This mechanism serves to prevent the planetary gear 34 from being reversed by and disengaged from the gear 4 or 37. Since this mechanism is known as disclosed in U.S. Pat. No. 4,766,452, a detailed description is omitted.

FIGS. 7 to 11 are schematic views showing the driving of a flash mechanism. The arrangement of the illustrated embodiment is such that a flash emission unit is disposed above the pentagonal prism of a single-reflex camera so that it is driven to move up and down.

Figure 7:
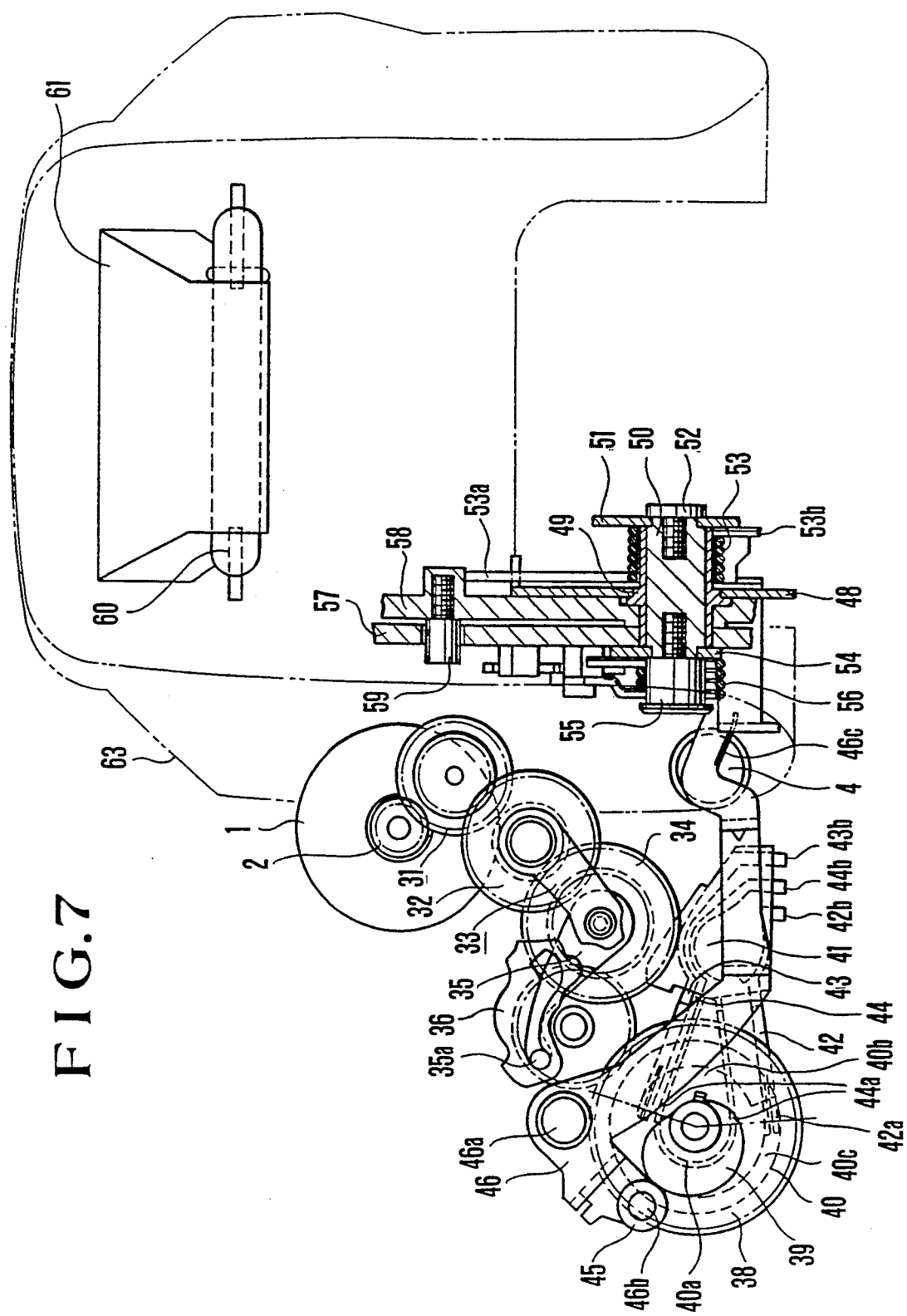
FIG. 7 is a diagrammatic view showing a state wherein the flash-unit down operation of the camera according to the first embodiment is completed and stopped.
Figure 8:
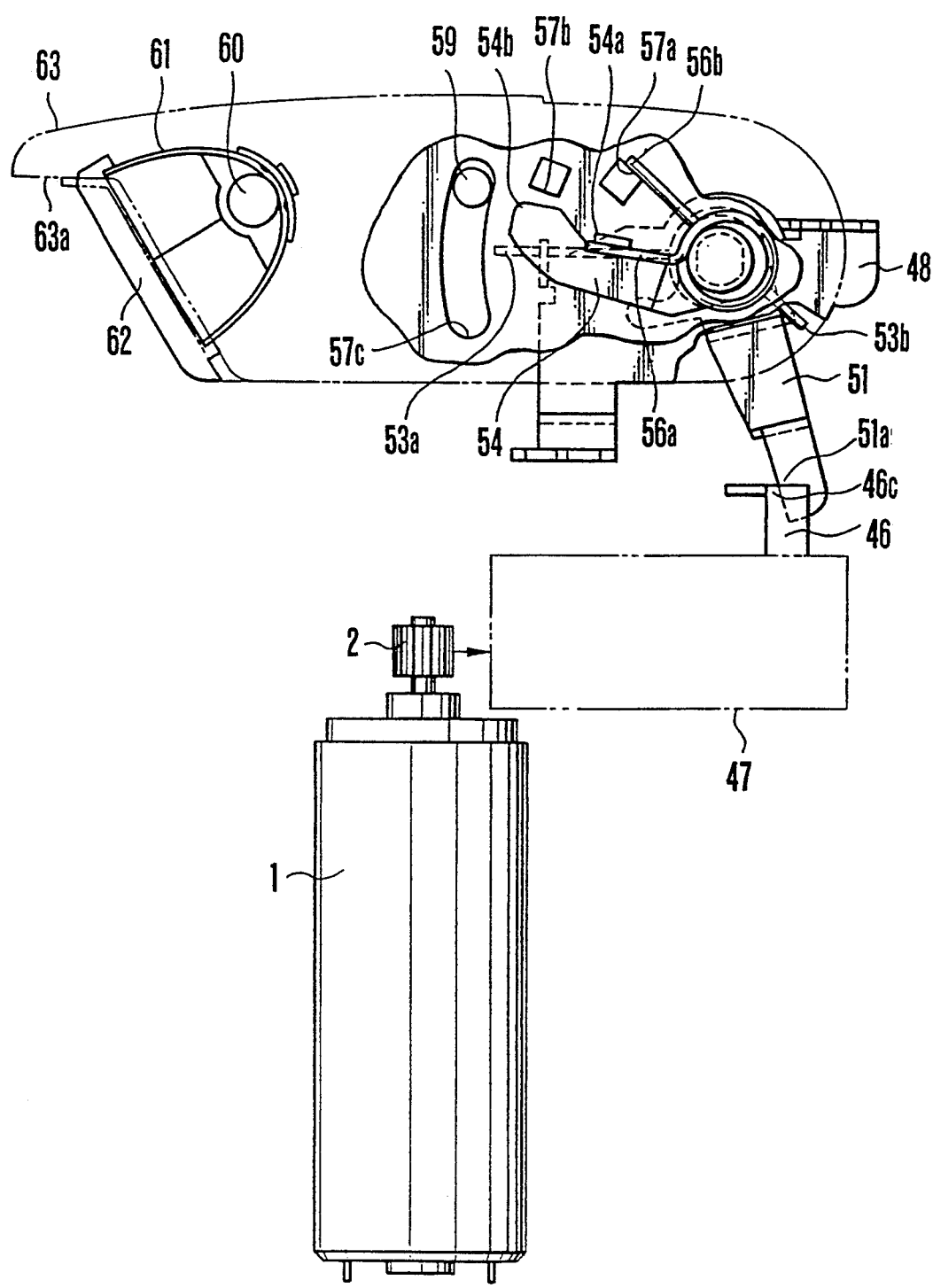
FIG. 8 is a schematic side view showing the state wherein the flash-unit down operation of the camera according to the first embodiment is completed and stopped.

FIGS. 7 and 8 are schematic views showing a flash-unit down state wherein a flash unit stops at its down position. As described in connection with FIG. 6, if the motor 1 is operated in the second direction (in the clockwise direction), the sun gear 32 rotates in the clockwise direction, while the planetary gear 34 revolves in the clockwise direction to mesh with the gear 37, thereby driving the flash mechanism. The driving mechanism is formed by two major assemblies which are respectively provided on a camera-body side and a top-lid side.

A driving cam 39 is formed integrally with the gear 38. As is apparent from the foregoing description, the gear 38 is driven in the counterclockwise direction only. A phase board 40 is fixed to the gear 38 and rotates integrally with the gear 38. The phase board 40 has conductive patterns 40a, 40b and 40c at one surface, and the conductive patterns 40a, 40b and 40c are concentrically spaced part and arranged in such a manner as to be kept in conduction. In operation, the conductive pattern 40a is kept in conduction around its entire circumference, and is supplied with a ground potential from a contact 44a of a ground input contact piece 44. The outermost conductive pattern 40c makes contact with a contact 42a of the signal detecting contact piece 42, and functions to produce a motor-energization stop signal. In the flash-unit down state shown in FIG. 7, the contact 42a and the conductive pattern 40c are kept in conduction, and the signal detecting contact piece 42 is held at its low level by being supplied with a ground level of potential. When upward driving of the flash unit is initiated and a predetermined stop phase is reached, the conductive pattern 40c and the contact 42a are disconnected from each other and the signal detecting contact piece 42 is set to its high state, thereby stopping the energization of the motor.

The conductive pattern 40b makes contact with a contact 43a of the signal detecting contact piece 43, and functions to produce a stop-position check signal for the downward and upward movement of the flash unit. When the flash unit stops at the down position (flash-unit down position), the signal detecting contact piece 43 is supplied with a high-level signal, while when the flash unit stops at the up position (flash-unit up position), the signal detecting contact piece 43 is supplied with a low-level signal. The above-described arrangement is used to perform some checks to ensure proper operation such as a check on whether the amount of overrunning after the stop of motor energization is within a predetermined value. The signal detecting contact piece 43 is held by a holding member 41 and is wired through connection portions 42b, 43b and 44b. A driving lever 46 is pivotally supported by a shaft 46a, and a roller 45 is rotatably supported by a roller shaft 46b. The roller 45 is maintained in contact with the driving cam 39. In the case of the flash-unit down state, the roller 45 is in contact with the maximum-diameter portion of the driving cam 39. In the case of a flash-unit up state wherein the flash unit stops at its up position, the roller 45 is in contact with the minimum-diameter portion of the driving cam 39. The above-described driving mechanism is provided on the camera-body side.

The driving mechanism provided on the top-lid side will be described below with reference to FIGS. 7 and 8. A holding member 48 is fixed to a top lid 58. A bearing 49 is fixed to the holding member 48 by caulking, and rotatably supports a transmission shaft 50. A lever 51 is fixed to the transmission shaft 50 by a screw 52 and is held non-rotatably with respect to the transmission shaft 50. An upward urging spring 53 has an arm 53a held on the holding member 48 and makes an arm 53b act on the lever 51, thereby urging the lever 51 in the clockwise direction, as viewed in FIG. 8, to produce a force for pressing the flash unit upward. The bearing 49 extends outward of the top lid 58 through a positioning opening thereof to rotatably support a flash case 57. A lever 54 is non-rotatably supported at the other end of the transmission shaft 50 and fixed by a screw 55. An absorption spring 56 has an arm 56a held on an engagement portion 54a of the lever 54 and an arm 56b held on a projection 57a of the flash case 57, thereby urging the lever 54 in the clockwise direction and the flash case 57 in the counterclockwise direction. By the above-described urging force, the flash case 57 and the lever 54 are attracted toward each other until their abutment portions 54b and 57b are brought into abutment with each other. The flash emission part is formed by a xenon tube 60, a reflector 61 and a Fresnel lens 62, and is secured to the flash case 57. A chain double-dashed line 63 represents a flash cover serving as a member which forms an external appearance and which is fixed to the flash case 57. A stopper 59 is secured to the top lid 58, and is maintained in contact with a stopper portion 57c to define the flash-unit up position when the flash unit is up. The above-described mechanism is provided on the side where the top lid 58 is positioned. The interface between the above-described mechanisms which are respectively provided on the camera-body side and the top-lid side is accomplished by the abutment between a cam portion 46c of the driving lever 46 and an abutment portion 51a of the lever 51. A chain double-dashed line 47 represents a transmission mechanism unit.

In the flash-unit down state shown in FIGS. 7 and 8, the lever 51 is rotated against the upward urging spring 53 in the counterclockwise direction (as viewed in FIG. 8) as a result of the clockwise rotation of the driving lever 46 (as viewed in FIG. 7). During this state, a stopper portion 63a of the flash cover 63 is maintained in abutment with a stopper (not shown) to prevent counterclockwise rotation of the flash case 57 and the flash cover 63. In this state, the tolerance of the gap between the flash cover 63 and the continuous portion of an exterior part (not shown) can be maintained according to a gap determined by the abutment portion.

To absorb errors in the interface between the camera-body side and the top-lid side, the lever 51 is fully overcharged in the counterclockwise direction, but the amount of overcharging is absorbed by the absorption spring 56. In addition, a retaining force for the flash cover 63 is determined by the force of the absorption spring 56. According to the above-described embodiment, if the energy-accumulating capacity of the absorption spring 56 is set larger, energy loss is extremely small since the amount of operation due to overcharge is small.

Figure 9:
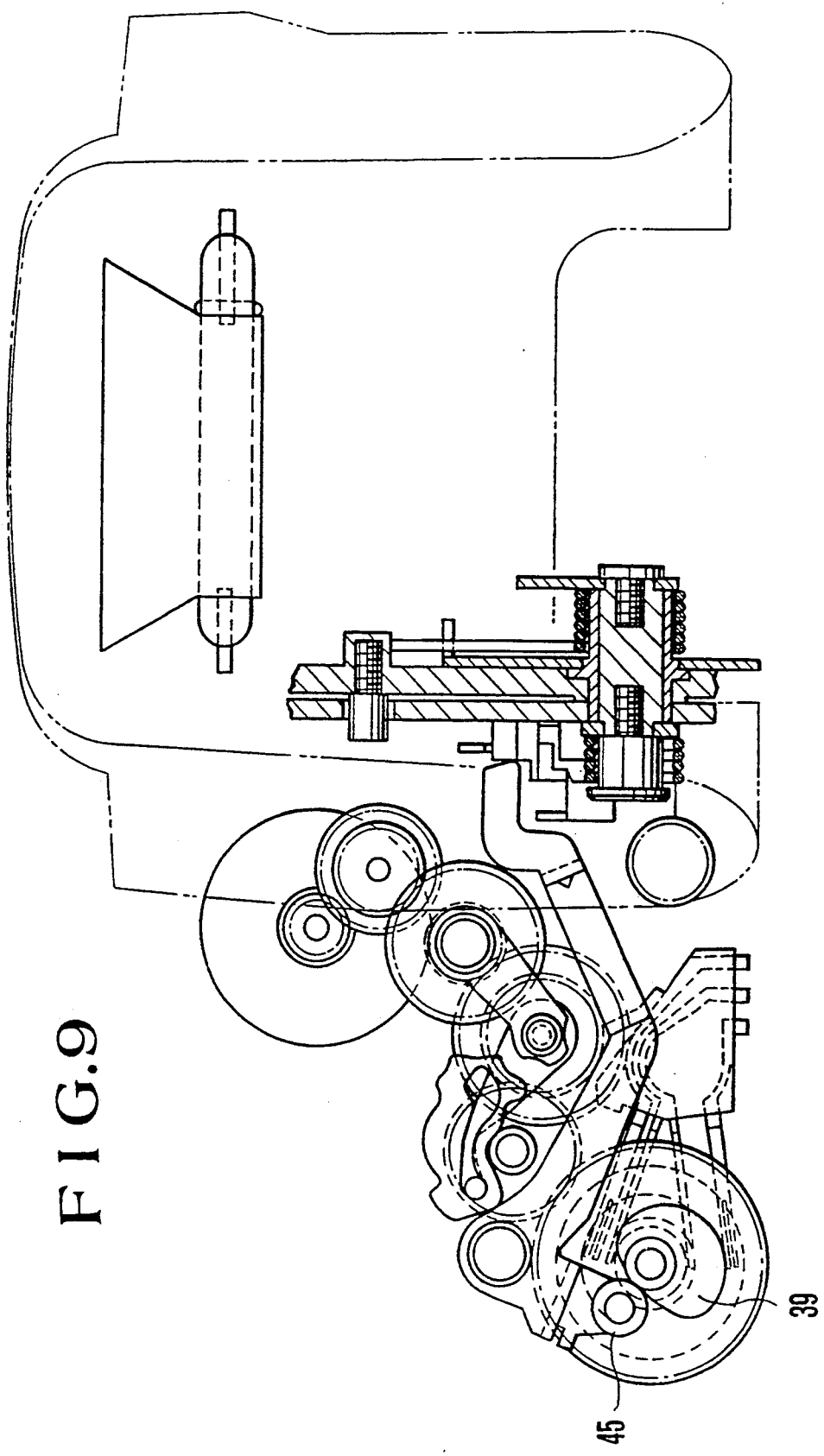
FIG. 9 is a diagrammatic view showing a state wherein the flash-unit up operation of the camera according to the first embodiment is completed and stopped.
Figure 10:
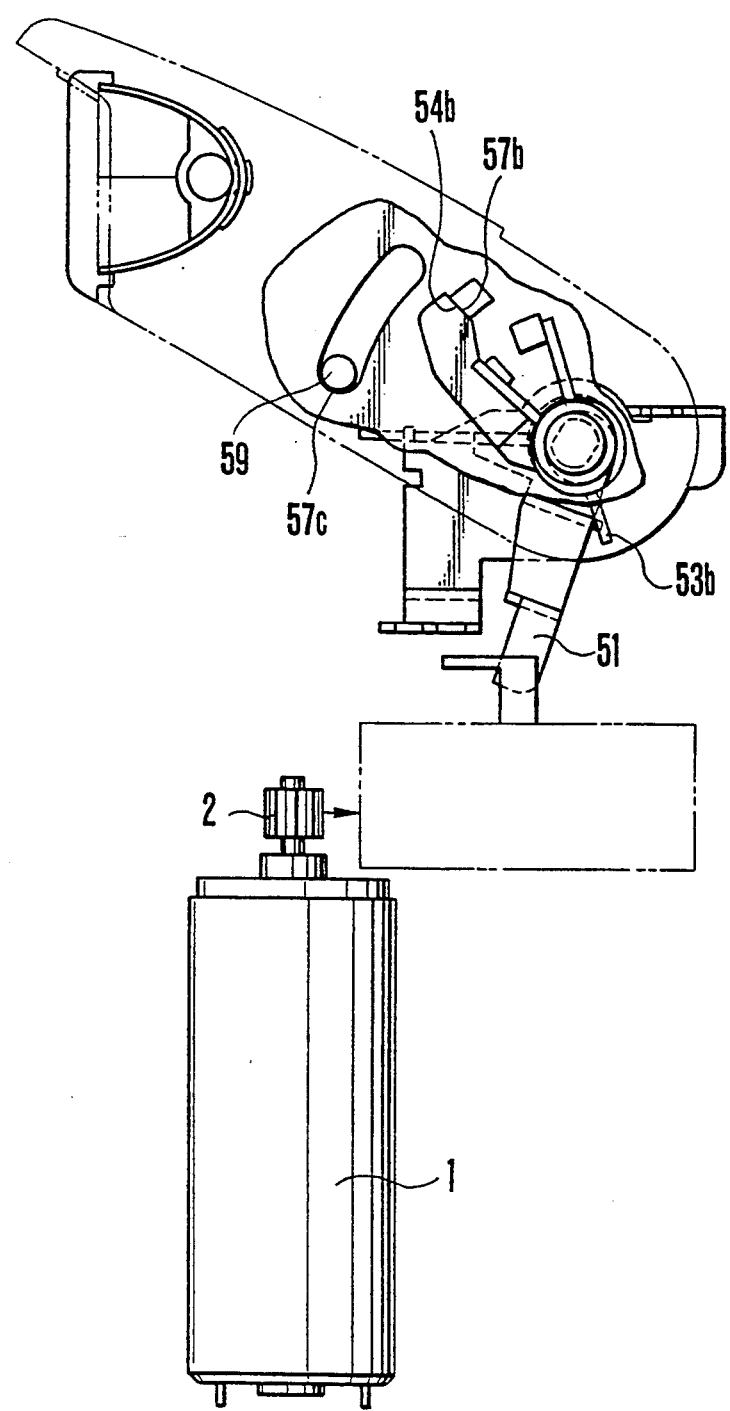
FIG. 10 is a schematic side view showing the state wherein the flash-unit up operation of the camera according to the first embodiment is completed and stopped.

FIGS. 9 and 10 are schematic views showing a flash-unit up state according to the first embodiment. The roller 45 is in contact with the minimum-diameter portion of the driving cam 39. The lever 51 is rotated in the clockwise direction as viewed in FIG. 10 by the urging force of the upward urging spring 53, and the abutment portion 54b of the lever 54 which rotates integrally with the lever 51 is brought in abutment with the abutment portion 57b, whereby the flash case 57 is rotated in the clockwise direction. The clockwise rotation of the flash case 57 is restricted by the abutment between the stopper 59 and the abutment portion 57c so that the flash unit stops at the flash-unit up position. Although only the stopper and rotary shaft of the flash case 57 positioned on the driving side are shown, a similar supporting arrangement is provided on the opposite side which is not shown.

FIG. 11 is a table showing changes in a signal detection state during a flash-unit driving operation. In a state wherein the flash unit stops at the down position, the signal detecting contact piece 42 is at the low (Lo) level with the signal detecting contact piece 43 at the high (Hi) level. While the flash unit is moving upward, the signal detecting contact piece 43 switches to the low level. Then, when it is detected that the signal detecting contact piece 42 has switched to the high level, the upward movement of the flash unit enters a braking start phase. In a state wherein the flash unit stops at the up position, the signal detecting contact piece 42 is at the high level with the signal detecting contact piece 43 at the low level.

The operation of moving the flash unit to the down position will be described below.

While the flash unit is moving downward, the signal detecting contact piece 43 switches to the high level. Then, when it is detected that the signal detecting contact piece 42 has switched to the low level, the downward movement of the flash unit enters a braking start phase. In this manner, the flash unit returns to the down position and stops there. The signals of the signal detecting contact pieces 42 and 43 return to the aforesaid states, respectively.

Figure 18:
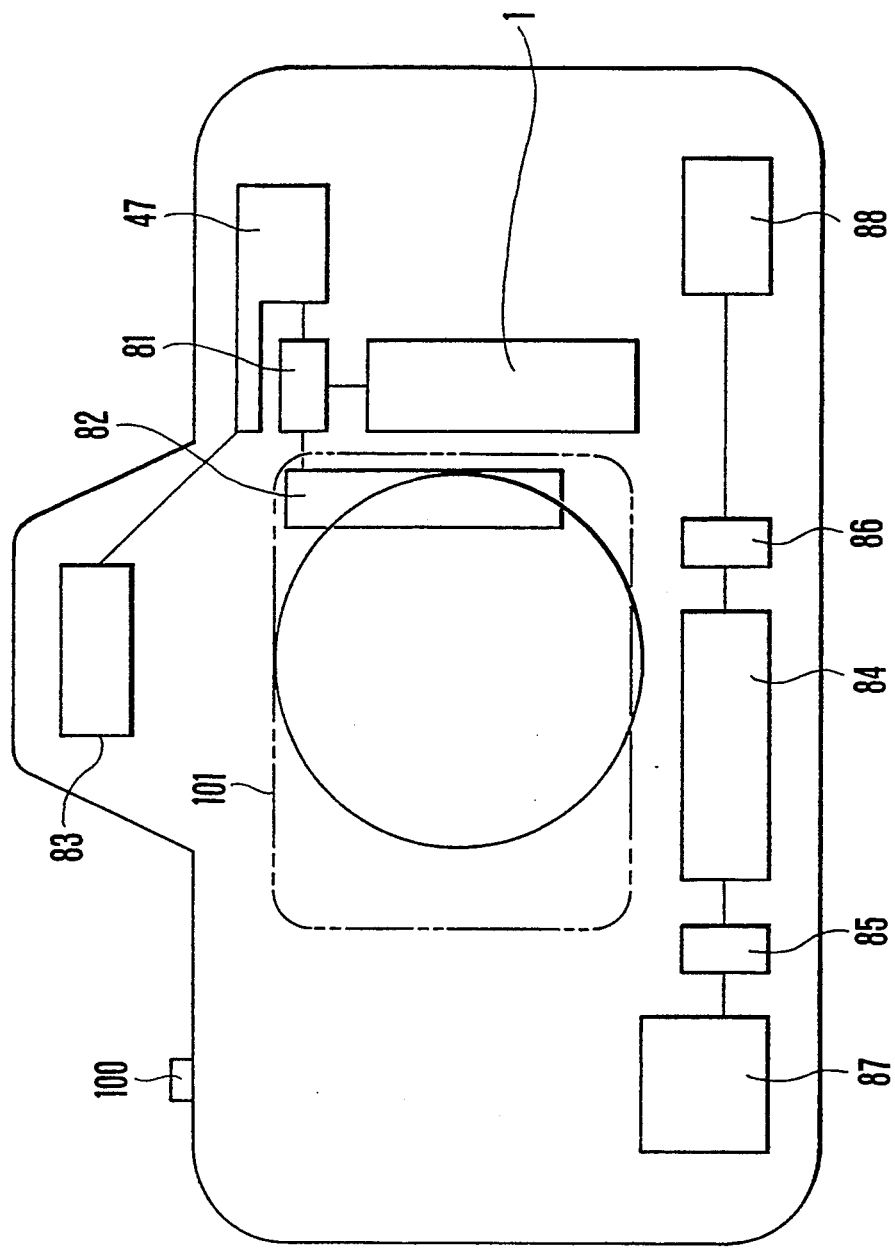
FIG. 18 is a schematic front view showing one example of the internal layout of the camera according to an embodiment.

FIG. 18 is a schematic view showing the arrangement of motors in the entire camera. When in operation in a first direction, the aforesaid motor 1 is coupled to a mechanism 82 for effecting an exposure-preparatory operation via a planetary change-over mechanism 81. When in operation in a second direction, the motor 1 is coupled to a flash driving mechanism 47 via the planetary change-over mechanism 81, thereby driving a flash unit 83.

A film transporting motor 84 is laterally disposed in a bottom portion of the camera. The motor 84 is provided with output shafts on opposite sides. One shaft is coupled to a film winding mechanism 87 via a one-way clutch 85, while the other shaft is coupled to a film rewinding mechanism 88 via a one-way clutch 86. When the film transporting motor 84 is operating in the first direction, the film winding mechanism 87 is driven with the film rewinding mechanism 88 disconnected. When the film transporting motor 84 is operating in the second direction, the film rewinding mechanism 88 is driven with the film winding mechanism 87 disconnected.

Figure 12:
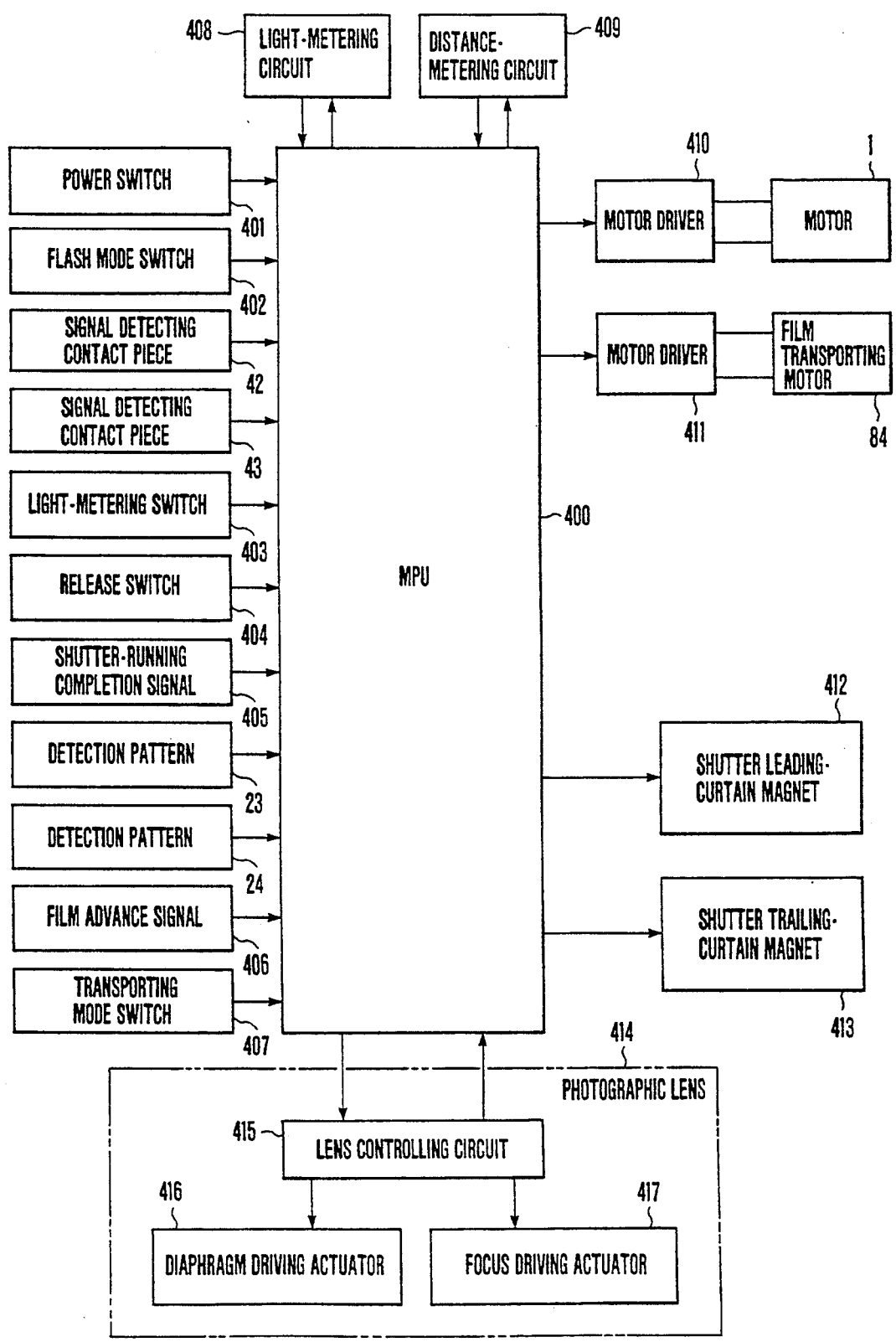
FIG. 12 is a block diagram showing a control circuit for the camera according to the first embodiment.

FIG. 12 is a schematic block diagram showing a control circuit according to the above-described embodiment. The signal of a power switch 401 is inputted to a microprocessing unit (MPU) 400, and when the power switch 401 is turned on, the camera is set to its operation-enable state. Even in a state wherein the power switch 401 is off, as long as no battery is removed, electrical power continues to be supplied to the MPU 400 and the memory of the memory device, such as a random-access memory, of the MPU 400 is held. A flash mode switch 402 inputs to the MPU 400 a mode signal indicative of an automatic-flash mode, a manual-flash ON mode or a manual-flash OFF mode. The signal of each of the signal detecting contact pieces 42 and 43 which serves as a signal for controlling driving of the flash unit, is also inputted to the MPU 400. A transporting mode switch 407 serves as a switch for switching continuous- and single-shooting modes from one mode to the other, and the output from the transporting mode switch 407 is inputted to the MPU 400.

A light-metering switch 403 is turned on at the first stroke of a release button 100 (see FIG. 18) and a release switch 404 is turned on at the second stroke. The signals of the light-metering switch 403 and the release switch 404 are inputted to the MPU 400. A shutter-running completion signal 405 which is used for detecting the completion of running of the trailing curtain of a shutter 101 (see FIG. 18) is also inputted to the MPU 400. The signals of the aforesaid detection patterns 23 and 24 are also inputted to the MPU 400 for the purpose of controlling the motor 1 or other purposes. In addition, a film advance signal 406 is inputted to the MPU 400. A light-metering circuit 408 and a distance-metering circuit 409 receive information on operational timing from the MPU 400 and transmit their respective outputs to the MPU 400.

The motor 1 and the film transporting motor 84 are driven by the respective motor drivers 410 and 411 in response to the signals of the MPU 400. The film transporting motor 84 effects film winding during a forward operation and film rewinding during a reverse operation. Each of the motor drivers 410 and 411 has a bridge circuit which is capable of switching one of the motor 1 and the film transporting motor 84 between a driving state by forward or reverse energization and an electrically braked state by formation of a-short-circuit. If the shutter 101 is to be actuated, a shutter leading-curtain magnet 412 is energized in accordance with the signal of the MPU 400 to start running of a leading curtain and, when the duration of a predetermined shutter time elapses, a shutter trailing-curtain magnet 413 is energized in accordance with the signal of the MPU 400 to start running of the trailing curtain. The interface between a photographic lens 414 and the camera body is accomplished not by a mechanical coupling but by the electrical communication between the camera-side MPU 400 and a lens controlling circuit 415.

Electrical power for driving the photographic lens 414 is supplied from the camera side. The photographic lens 414 includes a diaphragm driving actuator 416 and a focus driving actuator 417. The photographic lens 414 individually drives the diaphragm driving actuator 416 and the focus driving actuator 417 by means of the lens controlling circuit 415 in response to driving timings specified by the MPU 400.

FIGS. 13 to 15A, 15B and 15C are control flowcharts showing the control of the MPU 400.

Figure 13:
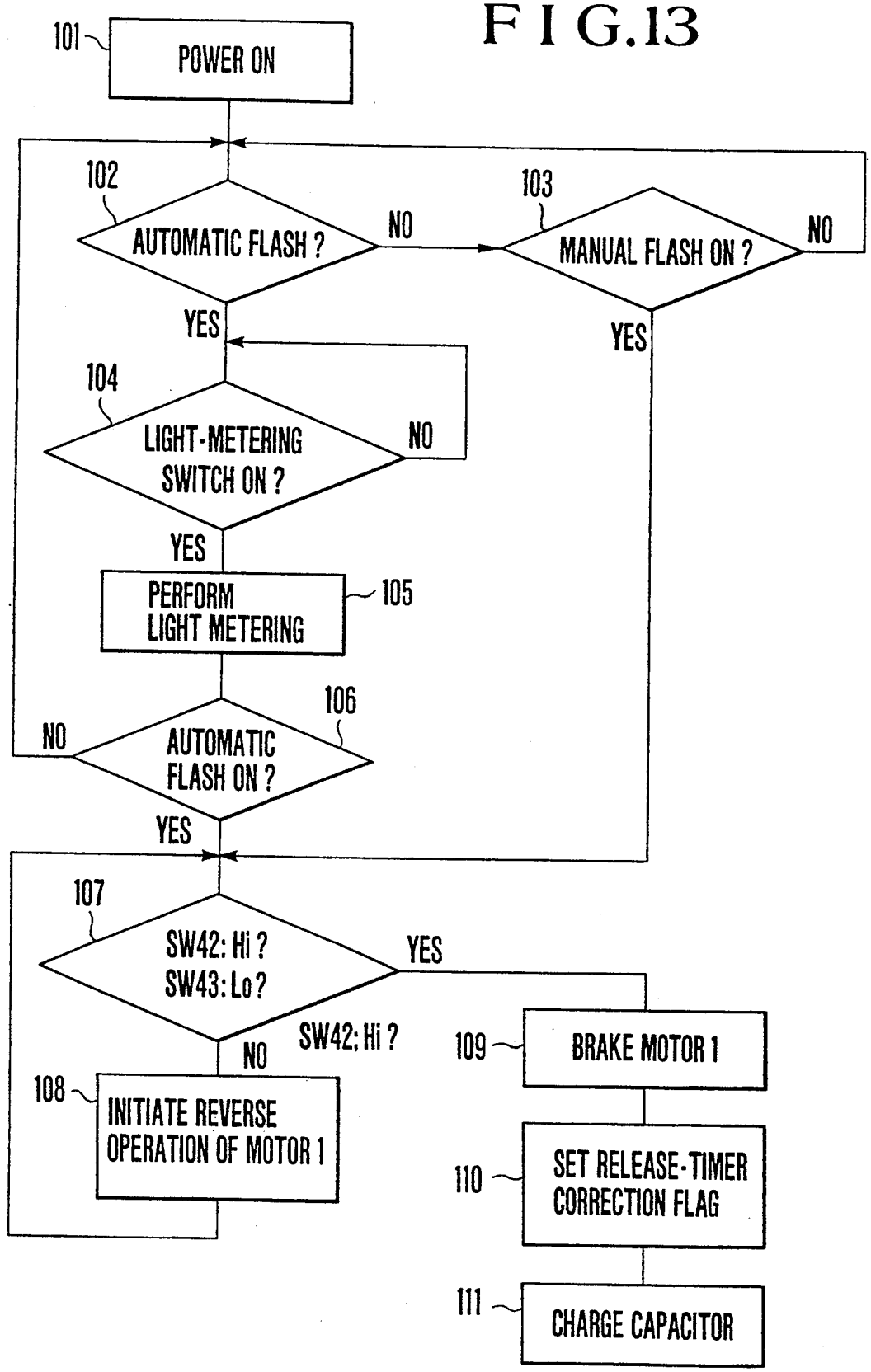
FIG. 13 is a flowchart showing the flash-unit up operation of the camera according to the first embodiment.

FIG. 13 is a control flowchart showing the operation of moving the flash unit upward. In this embodiment, control is provided so that the flash unit is always set to the flash-unit down state when an electrical power source is off. If the electrical power source is turned on in Step 101, the process proceeds to Step 102, where it is determined whether the flash mode switch 402 is set in the automatic-flash mode. If the flash mode switch 402 is set in the automatic-flash mode, the process proceeds to Step 104, but in the case of the manual-flash mode, the process proceeds to Step 103. If the manual-flash OFF mode is detected, mode detection is repeated, and if the manual-flash ON mode is detected, the process proceeds to Step 107.

In the automatic-flash mode, if the light-metering switch 403 is turned on, light metering is carried out. If it is determined in Step 106 that flashing is not needed, the process returns to Step 102 and mode detection is repeated. If it is determined that flashing is needed, the process proceeds to Step 107. Whether the flash unit should be turned on in the automatic-flash mode is determined through detection of a dark condition, a backlit condition or the like, but a detailed description is omitted. If it is determined in Step 107 that the signal detecting contact piece 42 is at the low level and the signal detecting contact piece 43 is at the high level, the process proceeds to Step 108, where the motor 1 is driven in the second direction. If it is determined in Step 107 that the signal detecting contact piece 42 is at the high level and the signal detecting contact piece 43 is at the low level, the process proceeds to Step 109, where the motor 1 is electrically braked. In Step 110, a release-timer correction flag is set. Then, in Step 111, capacitor charging is carried out, and the process is set to a standby state. The release-timer correction flag, which has been set in Step 110, is intended to stabilize a release time lag, and is set when the flash mechanism is driven by causing the motor 1 to operate in the second direction. This release-timer correction flag is set while taking account of the time required to revolve the above-described planetary gear mechanism, and this setting is intended to correct a release-time-lag stabilizing timer while taking account of the time required to drive a mirror mechanism by the operation of the motor 1 in the first direction. The most important object of this setting is to correctly effect moving-subject predictive autofocus, and a detailed description thereof will be made later.

FIG. 14 is a flowchart showing the control flow of the operation of moving the flash unit downward. The following explanation is made on the assumption that the flash unit is up as explained with reference to FIG. 13. Steps 201 to 203 represent conditions for moving the flash unit downward, and if the flash mode switch 402 is turned off, or if an OFF command is issued in the automatic-flash mode on the basis of a decision made after the execution of light metering, or if the power switch 401 is turned off, the process proceeds to Step 204. Since the flash unit is up and the signal detecting contact pieces 42 and 43 are respectively at the high and low levels, the process proceeds to Step 205, where the motor 1 is operated in the second direction. If the signal detecting contact pieces 42 and 43 switch to the low and high levels, respectively, the process proceeds to Step 206, where the motor 1 is braked. Then, in Step 207, the release-timer correction flag is set, and the above-described sequence for moving the flash unit to the down position is completed.

The foregoing is a brief explanation of the flow of the operation of moving the flash unit up and down. In practice, a complicated flow is needed in connection with the flow of a photographic sequence which will be described later with reference to FIGS. 15A, 15B and 15C. However, the primary feature of the flow according to this embodiment resides in the fact that if the motor 1 is operated in the second direction, the release-timer correction flag is set as indicated in Steps 110 and 207. To clarify the feature, the flow is divided into segments as will be explained below.

Figure 15A:
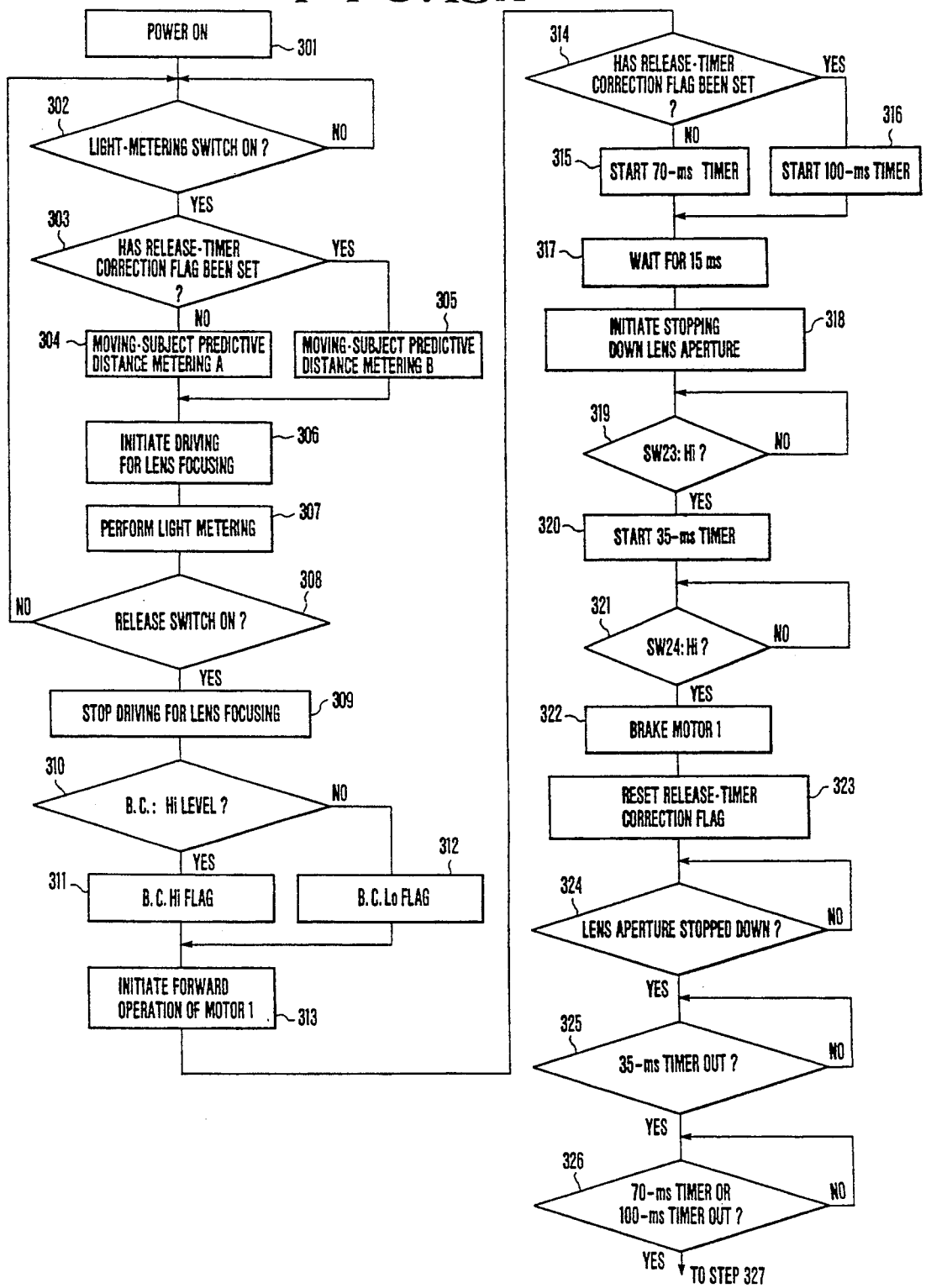

FIGS. 15A, 15B and 15C are flowcharts showing a photographic sequence according to the first embodiment. If the power switch 401 is turned on in Step 301, the state of the light-metering switch 403 is identified in Step 302. If the light-metering switch 403 is turned on, the process proceeds to Step 303. If the aforesaid release-timer correction flag has been set, a moving-subject predictive distance metering B is performed in Step 305; otherwise, a moving-subject predictive distance metering A is performed in Step 304.

The moving-subject predictive autofocus referred to herein is a system for determining the amount of lens driving on the basis of metered-distance data about a moving subject while taking into account a release time lag so as to bring the subject into focus at the time of actual exposure, as disclosed in U.S. patent application Ser. No. 259,783 filed on Oct. 19, 1988 (now U.S. Pat. No. 5,012,267, issued Apr. 30, 1991). Since such moving-subject predictive autofocus is a known art, a detailed description is omitted. The moving-subject predictive distance metering B is a variation of the moving-subject predictive distance metering A which is corrected for release time lag, and a correction value corresponds to the time required to assure the revolution time of the aforesaid planetary gear mechanism.

Then, in Step 306, driving for focusing of the photographic lens is initiated and, in Step 307, light metering is performed. In Step 308, the state of the release switch 404 is identified. If the release switch 404 is off, the process returns to Step 302, where the above-described operation is repeated. If the release switch 404 is on, the process proceeds to Step 309, where driving for lens focusing is stopped, and the process then proceeds to a release operation. This flow for controlling a release-enable condition is a mere example and various other flows may of course be considered.

In Step 310, a battery check is performed. The battery check is an actual-load check which is performed while electricity is being supplied to the shutter leading-curtain magnet 412 and the shutter trailing-curtain magnet 413 for approximately 10 ms. Accordingly, it is possible to fully and accurately detect the extent of consumption of a battery. If it is determined in Step 310 that the voltage level of the checked battery is higher than a predetermined voltage, the process proceeds to Step 311, where a B.C.Hi flag is set; if it is lower than the predetermined voltage, a B.C.Lo flag is set in Step 312. Although no reference is made in the explanation of the flow of this embodiment, if the voltage level of the checked battery becomes extremely low and reaches a preset inhibition voltage level, a release operation is inhibited and a warning indication is displayed. Then, in Step 313, energization is initiated so that the motor 1 is operated in the first direction, thereby initiating a mirror-up operation. If it is determined in Step 314 that the aforesaid release-timer correction flag has been set, the process proceeds to Step 316, where a 100-ms timer is started. If the aforesaid release-timer correction flag has not been set, the process proceeds to Step 315, where a 70-ms timer is started. The 100-ms timer and the 70-ms timer serve as a release-time-lag stabilizing timer. The interval of the 70-ms timer is set on the basis of the maximum period required for lens-diaphragm driving whose period varies with an aperture value. In addition, such interval is selected to be the duration it takes for the movable mirror 16 to complete its mirror-up operation. For the 70-ms timer, the 100-ms timer serves to correct a delay corresponding to the revolution time of the planetary gear 34. Accordingly, a release time lag which may occur during the execution of the above noted moving-subject predictive autofocus is kept constant, whereby prediction accuracy is improved. To prevent a rush current from occurring at the time of activation of the motor 1, when a time delay of 15 ms passes, the operation of stopping down a lens aperture is started. If the detection pattern 23 for detecting the phase of the mirror driving cam 8 switches to the high level, a mirror-up-state assurance 35-ms timer is started. The timing at which the detection pattern 23 switches to the high level corresponds to the phase where the movable mirror 16 starts to move up. The energization of the motor 1 is continued, and when the signal of the detection pattern 24 switches to the high level, the energization of the motor 1 is stopped and electrical braking is applied to the motor 1. Then, in Step 323, the release-timer correction flag is reset. If the lens aperture is stopped down, at the time when the conditions of the mirror-up-state assurance 35-ms timer and the release-time-lag stabilizing 70-ms timer are satisfied, energization of the shutter leading-curtain magnet 412 is performed. When the duration of a predetermined shutter speed passes, energization of the shutter trailing-curtain magnet 413 is performed to cause the shutter leading and trailing curtains to run, thereby effecting an exposure operation. When the shutter-running completion signal 405 is inputted, energization for causing the motor 1 to run in the first direction is started. When a time delay of 15 ms passes, the operation of fully opening the lens aperture is initiated. When the operation of fully opening the lens aperture is completed, energization of the film transporting motor 84 is initiated to start film winding. When the signal of the detection pattern 24 switches to the low level, a mirror-down-position stabilizing 40-ms timer is started. This timer serves to ensure that small vibrations remaining after the movable mirror 16 and the submirror 25 have reached the mirror-down position are stopped. If the transporting mode switch 407 is set to the continuous-shooting mode, distance- and light-metering operations are initiated. If the single-shooting mode is selected, the process proceeds to Step 340. If the B.C. flag memorized in Step 311 or 312 is at the high level when the signal of the detection pattern 24 switches to the low level, electrical braking is applied to the motor 1. If such B.C. flag is at the low level when the detection pattern 24 switches to the low level, after the detection pattern 24 has switched to the low level, electrical braking is applied to the motor 1. When the completion of film winding is detected in response to the film winding signal 406, the energization of the film transporting motor 84 is stopped and electrical braking is applied. If it is determined in Step 346 that the transporting mode switch 407 has been set to the continuous-shooting mode, the process proceeds to Step 347. If the single-shooting mode is selected, the process returns to Step 302. If the release switch 404 is on in Step 347, the process proceeds to Step 348; if it is off, the process returns to Step 302. If it is determined in Step 348 that the distance- and light-metering operations have been completed, driving for lens focusing is initiated. After a wait of 15 ms, energization for causing the motor 1 to run in the first direction is initiated, and the process proceeds to a mirror-up operation and the release-time-lag stabilizing 70-ms timer is started. Then, after a wait of 15 ms, the operation of stopping down the lens aperture is started. When the signal of the detection pattern 23 switches to the high level, the mirror-up-state assurance 35-ms timer is started. When the signal of the detection pattern 24 switches to the high level, the energization of the motor 1 is stopped and electrical braking is applied. When the operation of stopping down the lens aperture is completed in Step 359, the process proceeds to Step 360, where the driving for lens focusing is completed. When the mirror-up-state assurance 35-ms timer times out in Step 361 it is detected in Step 362 whether the release-time-lag stabilizing 70-ms timer has timed out. If it is detected that the 70-ms timer has timed out, the process returns to Step 327, where energization of the shutter leading-curtain magnet 412 is performed. Subsequently, a similar sequence of operations is performed in accordance with the aforesaid flow. If the release switch 404 remains on with the continuous-shooting mode selected, photography is continued in accordance with the aforesaid flow.

The foregoing is a description of the flow of the photographic sequence according to the first embodiment. Although the above explanation does not elaborate on film rewinding, film rewinding is accomplished by operating the film transporting motor 84 in the direction opposite to that of motor operation for film winding. Since this operation has no direct relationship to the present invention, a detailed description is omitted. According to the above-described first embodiment, in a two-motor type arrangement, both driving for an exposure-preparatory operation, such as shutter charging, and a film winding operation can be performed in parallel. Accordingly, the two-motor type arrangement can be used to achieve not only film rewinding but also independent driving of a flash mechanism while maintaining maximum performance with respect to the frame speed of continuous shooting, which is a primary reason for using the two-motor type arrangement. It is, therefore, possible to provide a very effective method of motor utilization.

Figure 16:
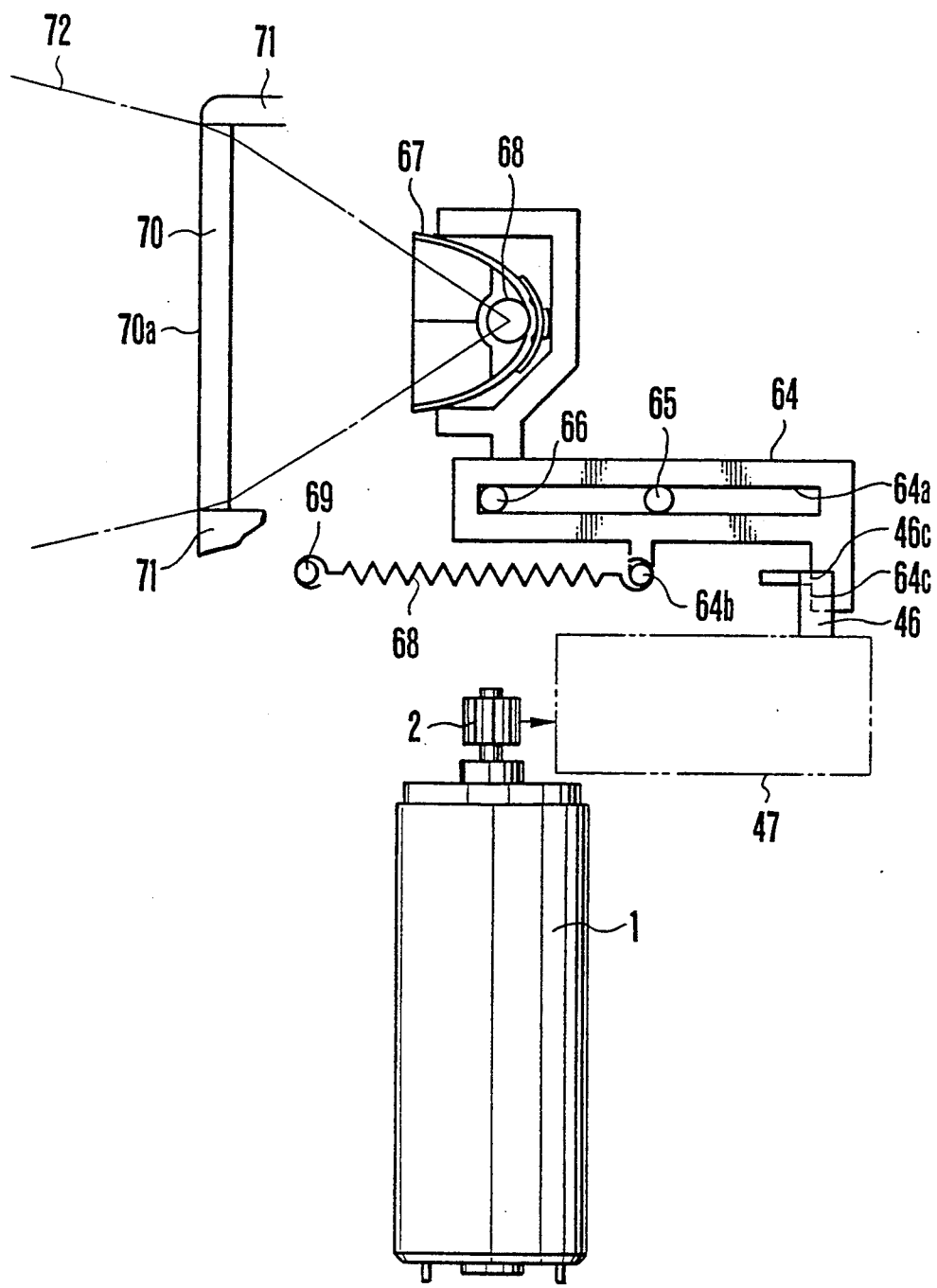
FIGS. 16 and 17 are schematic side views showing a second embodiment.
Figure 17:
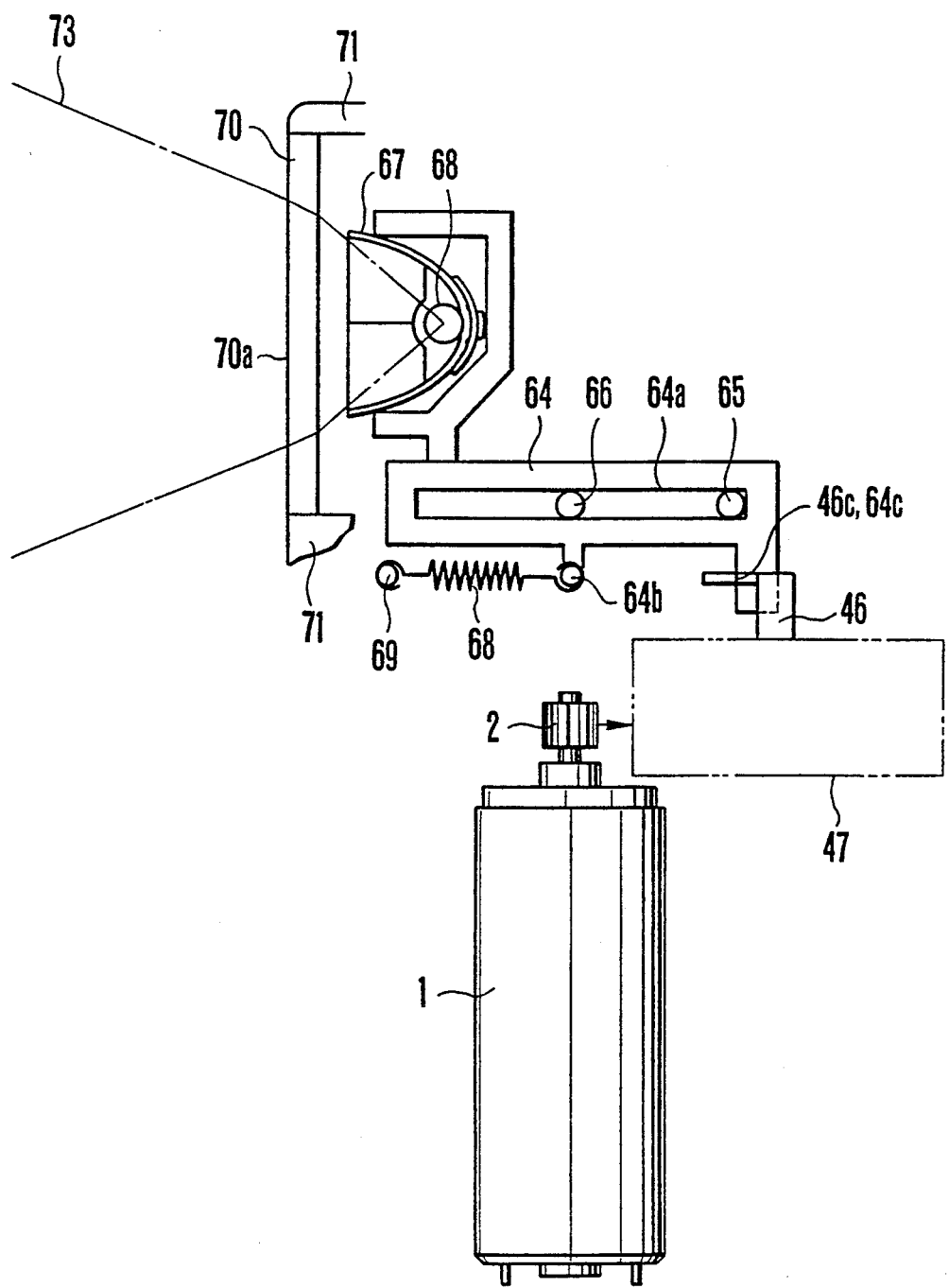

FIGS. 16 and 17 are schematic views showing a second embodiment of the present invention. Although, in the above-described first embodiment, the driving direction of the flash mechanism has been illustrated as upward and downward driving, the second embodiment adopts zoom driving as the driving direction of the flash mechanism.

FIG. 16 shows a state wherein a flash unit stops in a telephoto position, while FIG. 17 shows a state wherein the flash unit stops in a wide-angle position.

Initially, the state of FIG. 16 is explained below. The mechanism provided on the camera-body side, which includes the motor 1, the gear 2, the transmission mechanism unit 47 and the driving lever 46, is substantially the same as that used in the above-described first embodiment. The state shown corresponds to the flash-unit down state of FIG. 8. A reflector 67 and a xenon tube 68 are fixed to a holding member 64. The holding member 64 has a guide groove 64a which supports the flash unit by means of guide pins 65 and 66 in such a manner that the flash unit can travel in parallel to the optical axis. A spring 68 is held between spring hooking portions 69 and 64b which are fixed in position, and urges the holding member 64 toward the wide-angle position. In the state shown in FIG. 16, an abutment portion 64c of the holding member 64 is forced to stop at the telephoto position against a spring 68 by an abutment portion 46c of the driving lever 46. A Fresnel lens 70 has a Fresnel surface 70a and is held by a Fresnel-lens holding member 71. Reference numeral 72 denotes the telephoto-position light flux of direct light emitted from the center of the xenon tube 68.

The state of FIG. 17 will be explained below. The state of FIG. 17 corresponds to the flash-unit up state shown in FIG. 10. Since the driving lever 46 has reached the minimum-diameter portion of the driving cam 39, the holding member 64 is forced toward the Fresnel lens 70 by the urging force of the spring 68 and is positioned by the guide groove 64a and the guide pins 65. Reference numeral 73 denotes the wide-angle light flux of direct light emitted from the center of the xenon tube 68.

Since the flash-unit down and up states illustrated in the above-described first embodiment correspond respectively to the telephoto and wide-angle setting states in the second embodiment, a description is omitted as to the control of the motor 1.

As described above, driving for an exposure-preparatory operation, such as a mirror driving operation, a shutter charging operation and the like, is effected by the operation of a motor in the first direction, while driving of a flash unit is effected by the operation of the motor in the second direction. Accordingly, it is possible to provide a camera which has an arrangement with an excellent driving efficiency and which is capable of effectively utilizing the motor. Each of the aforesaid embodiments, in particular, has the advantage that, in a two-motor type arrangement, it is possible to achieve independent driving of a flash mechanism without increasing the number of actuators while maintaining maximum performance with respect to the frame speed of continuous shooting, which is a primary reason for using the two-motor type arrangement. In addition, as illustrated in each of the aforesaid embodiments, if the operating time of a clutch mechanism is taken into account to provide a release-time-lag correcting means, it is possible to realize more accurate moving-subject predictive autofocus.

As described above, the flash mechanism and the exposure-preparatory operation mechanism are each provided with an operation detecting means. Accordingly, even if a driving operation is switched by switching the operation of a single motor between the forward and reverse directions, an accurate operation can always be performed.

Also, since the flash unit is disposed above a pentagonal prism, it is easy to design the layout of the interior of a camera. More specifically, an exposure-preparatory operation mechanism including a mirror driving mechanism, a shutter charging mechanism and the like is disposed approximately in the middle of a camera body (in the case of each of the aforesaid embodiments, in a side wall area of the mirror box), and a flash mechanism is also disposed above the pentagonal prism in the middle of the camera body. Accordingly, it is possible to drive the exposure-preparatory operation mechanism and the flash mechanism without difficulty by means of a single motor. In consequence, it is possible to effectively utilize the inside portions of the camera body adjacent to both shoulders thereof, whereby a reduction in the size of the camera body can be achieved.

While, in each of the aforesaid embodiments, the flash unit is incorporated in the camera body, it is to be understood that the present invention is not limited to the above-described arrangements. The present invention encompasses, inter alia, an arrangement in which the flash unit is removably attached to the camera body.

What is claimed is:

1. A camera comprising:
   (a) a motor;
   (b) a flash mechanism, which performs multiple, repeatable operations that are driven by an output of said motor;
   (c) an exposure-preparatory operation mechanism which operates during a period from generation of a signal for starting release of exposure;
   (d) a clutch mechanism for transmitting the output of said motor to said flash mechanism during an operation of said motor in a first direction and to transmit the output of said motor to said exposure-preparatory operation mechanism during an operation of said motor in a second direction;
   (e) first detecting means for detecting an operational state of said flash mechanism;
   (f) second detecting means for detecting an operational state of said exposure-preparatory operation mechanism; and
   (g) controlling means for controlling driving of said motor in response to outputs from said first and second detecting means.

2. A camera according to claim 1, wherein the multiple, repeatable operations of said flash mechanism are comprised of a moving-up and a moving-down of a flash unit, and are driven by the operation of said motor in the first direction.

3. A camera according to claim 1, wherein the multiple, repeatable operations of said flash mechanism are comprised of a movement toward a wide-angle position and movement toward a telephoto position of a member in a flash unit, and are driven by the operation of said motor in the second direction.

4. A camera according to claim 1, wherein said exposure-preparatory operation mechanism moves a mirror from a finder-viewing position to an exposure position.

5. A camera according to claim 1, wherein said exposure-preparatory operation mechanism moves a mirror from a focus detecting position to an exposure position.

6. A camera according to claim 1, wherein said exposure-preparatory operation mechanism cancels a charged state of a shutter.

7. A camera according to claim 2, wherein the flash unit is disposed above a pentagonal prism.

8. A camera according to claim 3, wherein the flash unit is disposed above a pentagonal prism.

9. A camera according to claim 1, further comprising release-time-lag correcting means arranged to be set by the operation of said motor in the first direction and to be cancelled by the operation of said motor in the second direction.

10. A camera according to claim 4, further comprising release-time-lag correcting means arranged to be set by the operation of said motor in the first direction and to be cancelled by the operation of said motor in the second direction.

11. A camera according to claim 2, wherein said first detecting means detects a completion of movement of said flash unit from a down position to an up position and a completion of movement of said flash unit from the up position to the down position.

12. A camera according to claim 3, wherein said first detecting means detects completion of movement of said member in said flash unit from said wide-angle position to said telephoto position and completion of movement of said member in said flash unit from said telephoto position to said wide-angle position.

13. A camera according to claim 4, wherein said second detecting means detects a completion of movement of said mirror from the finder-viewing position to the exposure position.

14. A camera according to claim 5, wherein said second detecting means detects a completion of movement of the mirror from the focus detecting position to the exposure position.

15. A camera according to claim 6, wherein said second detecting means detects a completion of movement of the shutter from a charged position to a charge-cancelled position.

* * * * *